United States Patent
Kagian et al.

(10) Patent No.: US 11,544,740 B2
(45) Date of Patent: Jan. 3, 2023

(54) METHOD AND SYSTEM FOR ADAPTIVE ONLINE UPDATING OF AD RELATED MODELS

(71) Applicant: Yahoo Holdings, Inc., Sunnyvale, CA (US)

(72) Inventors: Amit Kagian, Pardes-Hana (IL); Michal Aharon, Haifa (IL); Oren Shlomo Somekh, Bet-Yehoshua (IL)

(73) Assignee: YAHOO AD TECH LLC, Dulles, VA (US)

( * ) Notice: Subject to any disclaimer, the term of this patent is extended or adjusted under 35 U.S.C. 154(b) by 848 days.

(21) Appl. No.: 15/433,030

(22) Filed: Feb. 15, 2017

(65) Prior Publication Data

US 2018/0232660 A1    Aug. 16, 2018

(51) Int. Cl.
| | |
|---|---|
| *G06Q 30/02* | (2012.01) |
| *G06N 20/00* | (2019.01) |
| *G06N 5/00* | (2006.01) |
| *G06N 20/20* | (2019.01) |
| *G06N 7/00* | (2006.01) |

(52) U.S. Cl.
CPC ......... *G06Q 30/0254* (2013.01); *G06N 5/003* (2013.01); *G06N 20/00* (2019.01); *G06N 20/20* (2019.01); *G06Q 30/0277* (2013.01); *G06N 7/005* (2013.01)

(58) Field of Classification Search
CPC ........... G06Q 30/0202; G06Q 30/0277; G06N 20/00; G06N 20/20; G06N 5/003; G06N 7/005
See application file for complete search history.

(56) References Cited

U.S. PATENT DOCUMENTS

| | | | |
|---|---|---|---|
| 10,657,556 B1 * | 5/2020 | Lu | G06N 20/00 |
| 2002/0184000 A1 * | 12/2002 | Christodoulou | G06Q 10/10 |
| | | | 703/22 |
| 2011/0264511 A1 * | 10/2011 | Zhang | G06Q 30/0244 |
| | | | 705/14.43 |

(Continued)

OTHER PUBLICATIONS

Bergstra et al., Random Search for Hyper-Parameter Optimization, Journal of Machine Learning Research, Feb. 13, 2012, pp. 281-305, Montreal, Canada.

(Continued)

*Primary Examiner* — Kamran Afshar
*Assistant Examiner* — Marshall L Werner
(74) *Attorney, Agent, or Firm* — Venable LLP

(57) ABSTRACT

The present teaching relates to generating an updated model related to advertisement selection. In one example, a request is obtained for updating a model to be utilized for selecting an advertisement. A plurality of copies of the model is generated. The model is pre-selected based on a performance metric related to advertisement selection. Based on each of the plurality of copies, a candidate model is created by modifying one or more parameters of the copy of the model to create a plurality of candidate models. One of the plurality of candidate models is selected based on the performance metric. The steps of generating, creating, and selecting are repeated until a predetermined condition is met. The model is updated with the latest selected candidate model when the predetermined condition is met.

21 Claims, 18 Drawing Sheets

(56) References Cited

U.S. PATENT DOCUMENTS

| | | | |
|---|---|---|---|
| 2012/0191631 A1* | 7/2012 | Breckenridge | G06N 20/00 |
| | | | 706/12 |
| 2016/0132787 A1* | 5/2016 | Drevo | G06N 20/10 |
| | | | 706/12 |
| 2017/0098236 A1* | 4/2017 | Lee | G06Q 30/0244 |
| 2017/0147722 A1* | 5/2017 | Greenwood | G16B 5/20 |
| 2018/0060736 A1* | 3/2018 | Brewer | G06N 5/022 |

OTHER PUBLICATIONS

Chan et al., Continuous Hyperparameter Optimization for Large-scale Recommender Systems, In Proc. IEEE International Conference on Big Data, Separlment of Computer Science, University College London, 2013, London, United Kingdom.

* cited by examiner

METHOD AND SYSTEM FOR ADAPTIVE ONLINE UPDATING OF AD RELATED MODELS

BACKGROUND

1. Technical Field

The present teaching relates to methods, systems, and programming for Internet services. Particularly, the present teaching is directed to methods, systems, and programming for adaptively updating an online model related to advertisement selection.

2. Discussion of Technical Background

The Internet helps a web service provider to provide advertisements of various types. Native ad is a type of advertising that matches the form and function of the platform upon which it appears. For example, the Gemini native marketplace serves users with ads that are rendered to resemble the surrounding native content.

The Gemini native marketplace, like all other ad marketplaces, is a dynamic environment that is influenced by seasonality, and other temporal factors such as market trends, churning and appearing of large advertisers, and worldwide events. Therefore, having a single fixed hyper-parameters set (or configuration) is sub-optimal. Even without considering environmental changes, a fixed set of hyper-parameters may not fit a model throughout its whole life-cycle. A mature model that has already been trained over months of data may require a different set of hyper-parameters rather than the set found by an initial parallel grid-search. On the other hand, performing a parallel grid-search from time to time, using fresh logged data is a time consuming task.

Therefore, there is a need to provide an improved solution for updating an online model related to advertisement selection to solve the above-mentioned problems.

SUMMARY

The present teaching relates to methods, systems, and programming for Internet services. Particularly, the present teaching is directed to methods, systems, and programming for adaptively updating an online model related to advertisement selection.

In one example, a method, implemented on a machine having at least one processor, storage, and a communication platform capable of connecting to a network for generating an updated model related to advertisement selection is disclosed. A request is obtained for updating a model to be utilized for selecting an advertisement. A plurality of copies of the model is generated. The model is pre-selected based on a performance metric related to advertisement selection. Based on each of the plurality of copies, a candidate model is created by modifying one or more parameters of the copy of the model to create a plurality of candidate models. One of the plurality of candidate models is selected based on the performance metric. The steps of generating, creating, and selecting are repeated until a predetermined condition is met. The model is updated with the latest selected candidate model when the predetermined condition is met.

In a different example, a system having at least one processor, storage, and a communication platform capable of connecting to a network for generating an updated model related to advertisement selection is disclosed. The system includes: an online training data processor configured for obtaining a request for updating a model to be utilized for selecting an advertisement; a hyper parameter set perturbor configured for generating a plurality of copies of the model, wherein the model is pre-selected based on a performance metric related to advertisement selection, and creating, based on each of the plurality of copies, a candidate model by modifying one or more parameters of the copy of the model to create a plurality of candidate models; and a hyper parameter tuner configured for selecting one of the plurality of candidate models based on the performance metric, wherein the steps of generating, creating, and selecting are repeated until a predetermined condition is met, and updating the model with the latest selected candidate model when the predetermined condition is met.

Other concepts relate to software for implementing the present teaching of adaptively updating an online model related to advertisement selection. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for generating an updated model related to advertisement selection is disclosed. The information, when read by the machine, causes the machine to perform the following: obtaining a request for updating a model to be utilized for selecting an advertisement; generating a plurality of copies of the model, wherein the model is pre-selected based on a performance metric related to advertisement selection; creating, based on each of the plurality of copies, a candidate model by modifying one or more parameters of the copy of the model to create a plurality of candidate models; selecting one of the plurality of candidate models based on the performance metric; repeating the steps of generating, creating, and selecting until a predetermined condition is met; and updating the model with the latest selected candidate model when the predetermined condition is met.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
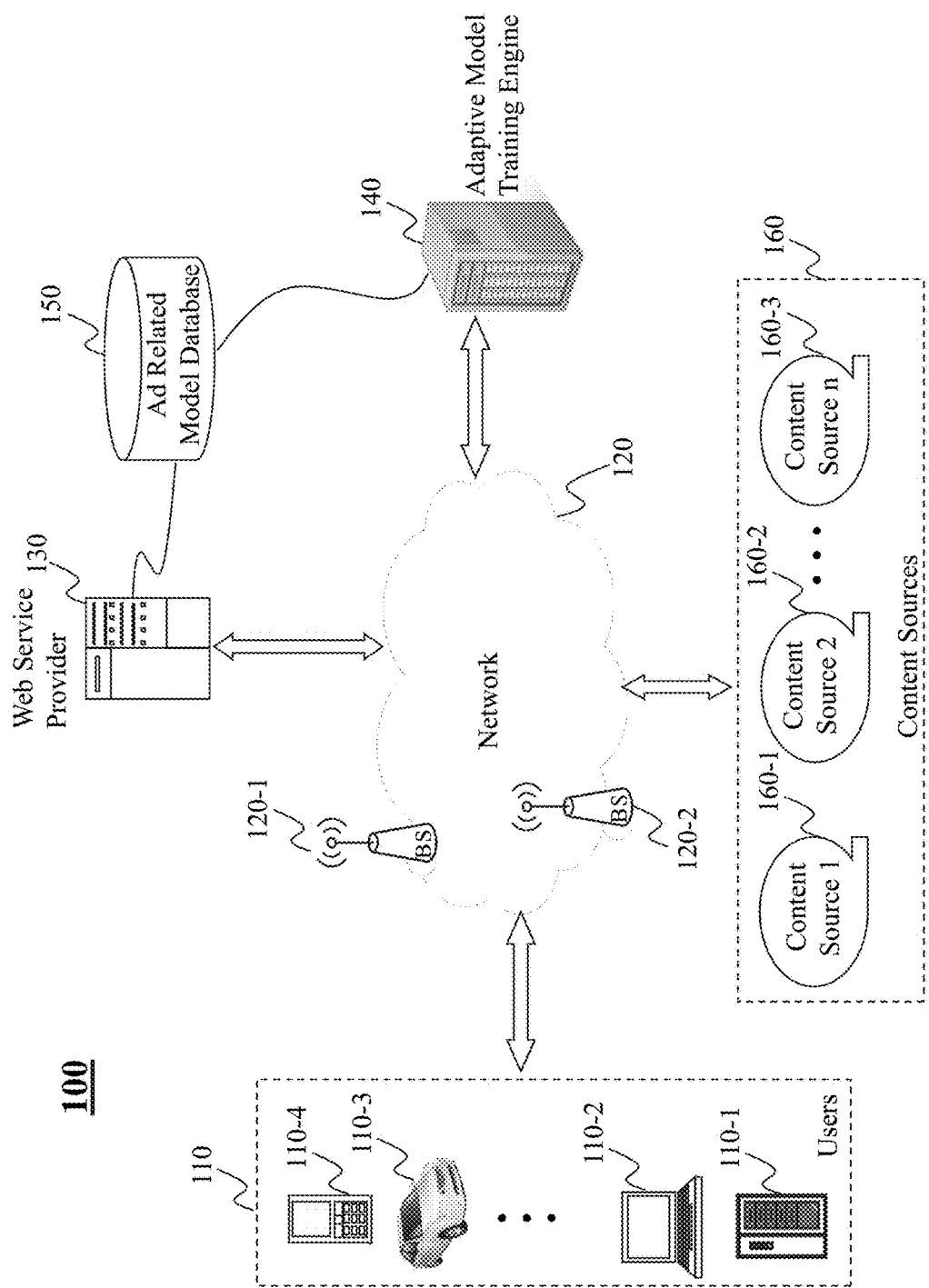
FIG. 1 is a high level depiction of an exemplary networked environment for adaptively updating an online model related to advertisement selection, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively updating an online model related to advertisement selection. The method and system as disclosed herein aim at adaptively updating an online model related to advertisement selection, taking into consideration temporal changes and divergence control.

A native marketplace, e.g. the Gemini native marketplace, can serve users with ads that are rendered to resemble the surrounding native content. In contrast to the search-ads marketplace, user intent during page visit is unknown. In order to rank the native ads for an incoming user and the specific context, a score may be calculated by multiplying the advertiser's bid and the predicted click probability (pCTR) for each ad. In addition to the cost-per-click (CPC) price type, a native marketplace may also use the omnichannel pricing with cross-channel (X), referred to as oCPx price type. According to oCPx price type, advertisers declare a target cost-per-action price (tCPA) for a conversion event (such as purchasing or filling a form) that occurs after a click. For this price type the system predicts the probability of a conversion given a click (pCONV) and multiplies it by the tCPA to get the effective oCPx bid, which is used during auctions.

The pCTR and pCONV may be calculated using models that are periodically updated by an algorithm, e.g. OFFSET (One-pass Factorization of Feature Sets), which is a feature enhanced collaborative-filtering (CF) based event-prediction algorithm that updates its latent factor model for every new batch of logged data using stochastic gradient descent (SGD). OFFSET may be implemented on the grid using map-reduce architecture, where every new batch of logged data is preprocessed and parsed by many mappers and the ongoing update of a model is conducted as a centralized process on a single reducer. As many other learning algorithms, OFFSET includes several hyper-parameters that can be tuned to provide best performance for given system conditions. The architecture of OFFSET makes it possible to do a parallel grid-search to find an optimal set of hyper-parameters (or configuration) and its resulting model, for boosting system performance. It usually takes a few days to train the system using a few weeks of logged data in order to get a mature model which can be pushed to production and start serving ads to users.

The present teaching discloses an online hyper-parameter tuning algorithm, which can take advantage of a system parallel map-reduce based architecture, and strive to adapt the hyper-parameter set to provide the best performance at a specific time interval. In one embodiment, the proposed tuning algorithm trains many models with different configurations in parallel, and identifies the best configuration and its corresponding model according to some performance metric. While this "best" model is used to serve users, the tuning algorithm uses the "best" configuration to generate P new configurations in its vicinity. Then, it continues training P copies of the best model each with one of the P new configurations using the new batch of logged data, and so on and so forth. In this manner, the tuning algorithm is continuously experimenting with alternative variations of the currently best performing hyper-parameters configuration. The tuning strives to track the best hyper-parameters set and its corresponding model that provide the best performance at each time interval. In addition to the "error-free" procedure described here, the tuning algorithm is able to handle also extreme scenarios where few or even all models were diverged and a recovery mechanism must be applied to ensure correct operation.

For simplicity matters, the present teaching focuses on a click-prediction version of OFFSET. However, in practice the tuning algorithm can optimize both models in production using slightly different setups. Moreover, the proposed tuning mechanism can be easily generalized to fit any learning algorithm that continuously learns on incoming streaming data, in order to adapt its hyper-parameters to temporal changes. Temporal changes, e.g. different holiday seasons like Thanksgiving and Christmas, can mean differently to users with respect to advertisement selection.

The terms "ad" and "advertisement" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for adaptively updating an online model related to advertisement selection, according to an embodiment of the present teaching. In FIG. 1, the exemplary networked environment 100 includes one or more users 110, a network 120, a web service provider 130, an adaptive model training engine 140, an ad related model database 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-1, laptop computers 110-2, a built-in device in a motor vehicle 110-3, or a mobile device 110-4. In one embodiment, users 110 may be connected to the network 120 and able to interact with the web service provider 130 and the adaptive model training engine 140 through wired or wireless technologies and related operating systems implemented within user-wearable devices (e.g., glasses, wrist watch, etc.).

A user, e.g., the user 110-1, may send requests to the web service provider 130 via the network 120 and receive web content with one or more advertisement from the web service provider 130, e.g. by accessing a web page hosted by the web service provider 130 or using an application supported by the web service provider 130. In general, the user may receive various online services from the web service provider 130 and provide user feedbacks to the web service provider 130.

The web service provider 130 may provide to the users 110 some online services like web portal, online search, news app, published content, etc. In some embodiment, the web service provider 130 may also provide support or update to some applications installed on a local device of a user. The web service provider 130 may collect user activities related to the online services or applications. The user activities may be used to select and/or rank advertisements based on a model stored in the ad related model database 150.

In one embodiment, the ad related model database 150 may store models to be utilized for selecting an advertisement, ranking advertisements, and predicting performance of an advertisement, etc. In general, the models in the ad related model database 150 may be generated based on a training process, and used by an application (not shown) in the web service provider 130, at the backend of the web service provider 130, or as a completely standalone system capable of connecting to the network 120.

The adaptive model training engine 140 may adaptively and continuously train an ad related model stored in the ad related model database 150 for advertisement selection at the web service provider 130. With fresh logged ad related data, the adaptive model training engine 140 can make use of latest trained model to tune the hyper parameters in the model to make it adapted to temporal changes. In one embodiment, the adaptive model training engine 140 may continuously train, in parallel, multiple versions of a learning model in the ad related model database 150 with P variations of the hyper-parameters set. In the end of each tuning cycle (e.g., an hour or 4 model training periods), each model version is evaluated and the current best hyper-parameters set and resulting model are identified. The training during the next cycle will continue from the best performing model with new generated variations of its hyper-parameters. By doing so, the system continuously experiments with variations of the tuned hyper-parameters set in order to make them adaptive to temporal changes.

The web service provider 130 may retrieve an ad related model from the ad related model database 150, and use this model to select one or more advertisements to be provided to a user via the network 120. The ad selection may also be based on personal information of the user, features of the candidate advertisements, contextual information of the ad selection, and information about bids submitted by advertisers. In addition, the web service provider 130 may generate an ad presentation instruction and provide the selected ad with the ad presentation instruction to the user device for presenting the advertisements. The ad presentation instruction may include information about how to present the advertisement like layout structure and ranking of the advertisements, which can also be determined based on an ad related model in the ad related model database 150.

The content sources 160 in the exemplary networked environment 100 include multiple content sources 160-1, 160-2 . . . 160-3. A content source 160 may correspond to a website hosted by an entity, whether an individual, a business, or an organization such as USPTO, a content provider such as CNN and YAHOO, a social network website such as FACEBOOK, or a content feed source such as TWITTER or blogs. The web service provider 130 may access information from any of the content sources 160-1, 160-2 . . . 160-3. For example, the web service provider 130 may fetch content, e.g., websites, through its web crawler from the content sources 160 and provide to the users 110.

Figure 2:
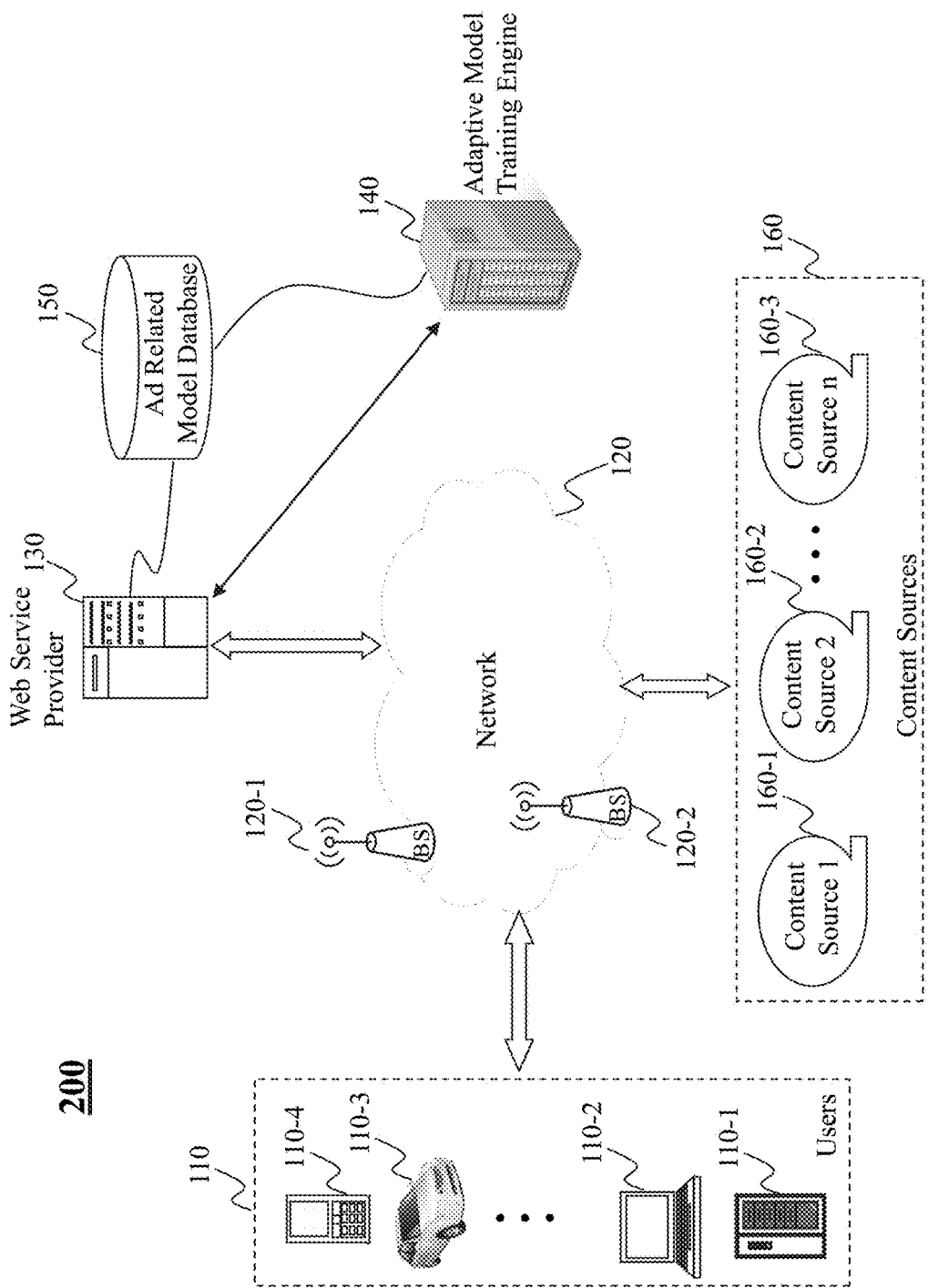
FIG. 2 is a high level depiction of another exemplary networked environment for adaptively updating an online model related to advertisement selection, according to an embodiment of the present teaching.

FIG. 2 is a high level depiction of another exemplary networked environment 200 for adaptively updating an online model related to advertisement selection, according to an embodiment of the present teaching. The exemplary networked environment 200 in this embodiment is similar to the exemplary networked environment 100 in FIG. 1, except that the adaptive model training engine 140 serves as a backend system for the web service provider 130.

Figure 3A:
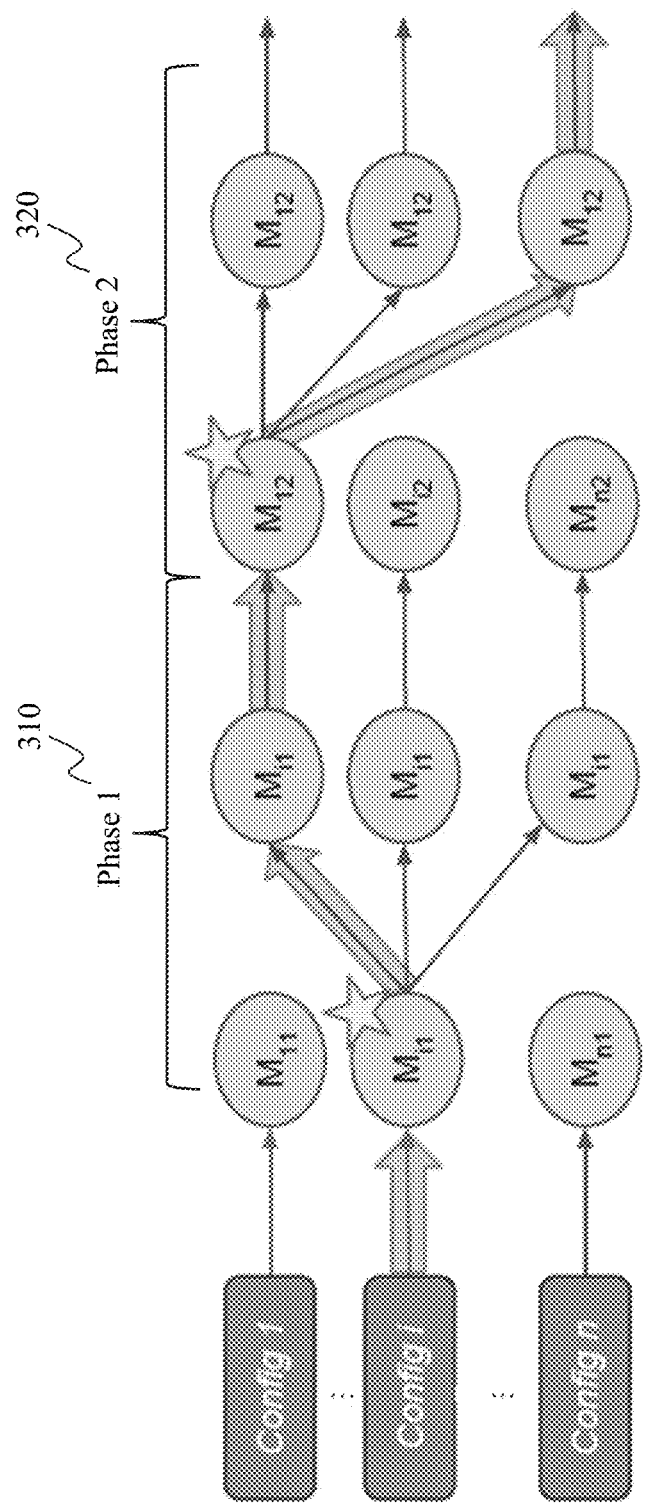
FIG. 3A depicts an exemplary process for continuous learning/training of an online model, according to an embodiment of the present teaching.

FIG. 3A depicts an exemplary process for continuous learning/training of an online model, according to an embodiment of the present teaching. As shown in FIG. 3A, at each time period, the system may take the best performing model and mark it as "best model." Then, for all configurations, the system loads the last best model and continues learning from it. For example, at beginning of phase 1 310, the system may take the best performing model $M_{t1}$ from last cycle and mark it as "best model", with a star in the example in FIG. 3A. Then, the system loads the last best model $M_{t1}$ and duplicates it into n copies corresponding to the n configurations, and continues learning the last best model $M_{t1}$ with the n configurations. As shown in FIG. 3A, the system determines a new best model $M_{t2}$ after the training during phase 1. Then, at phase 2 320, the system may take the best performing model $M_{t2}$ from last cycle and mark it as "best model", and continuously train, in parallel, the multiple versions of the learning model with n variations of the configurations. The process may be on-going so long as there is new ad related data coming in, and there is temporal change going on. In one embodiment, the process may stop temporarily when a predetermined condition is met to export an updated model for ad selection. For simplicity, the diagram in FIG. 3A shows a fixed set of configurations while in other embodiments, the system may generate new configuration variation at each time period.

Figure 3B:
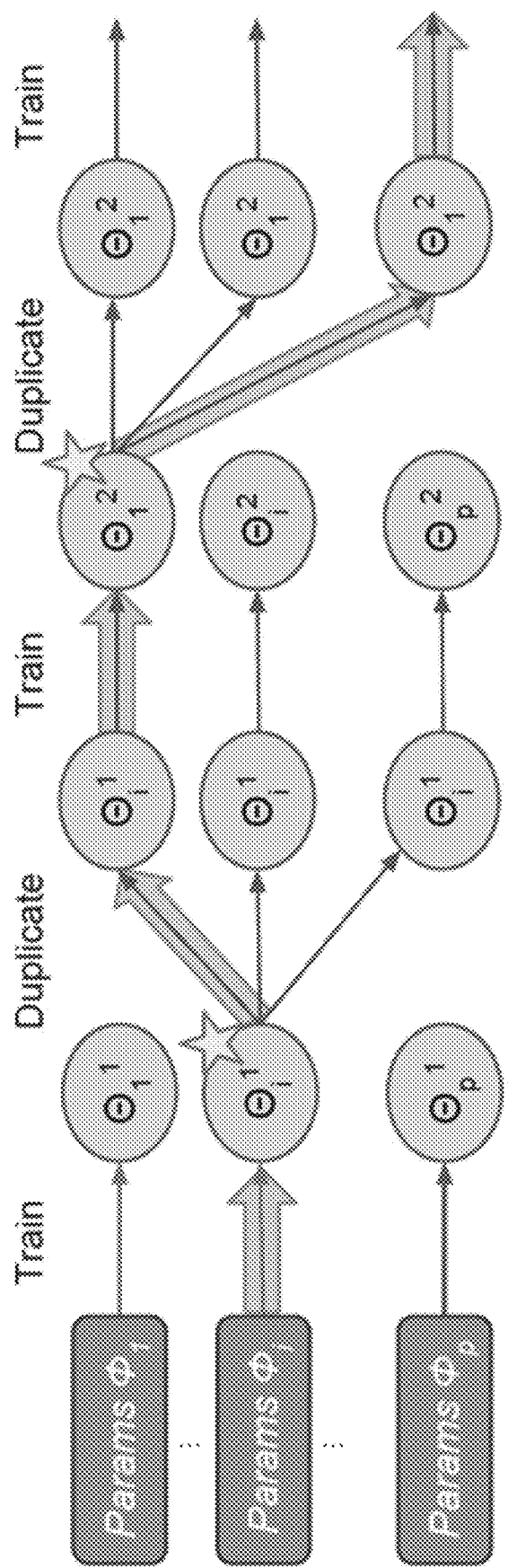
FIG. 3B depicts an exemplary process for continuous learning/training of an online model by tuning its hyper parameters, according to an embodiment of the present teaching.

FIG. 3B depicts an exemplary process for continuous learning/training of an online model by tuning its hyper parameters, according to an embodiment of the present teaching. A configuration of a model may include one or more parameters. Similar to FIG. 3A, the system in FIG. 3B may continuously train, in parallel, multiple versions of a learning model with P variations of the hyper-parameters set. In the end of each tuning cycle (e.g., an hour or 4 model training periods), each model version is evaluated and the current best hyper-parameters set and resulting model are identified. The training during the next cycle will continue from the best performing model with newly generated variations of its hyper-parameters. By doing so, the system continuously experiment with variations of the tuned hyper-parameters set in order to make them adaptive to temporal changes. FIG. 3A and FIG. 3B depict exemplary processes of virtually duplicating the best performing model and resuming its training with multiple hyper-parameter sets (configurations).

There may be an initial parameter tuning procedure via parallel grid search, conducted offline over several weeks of logged data, resulting with an initial mature model $\Theta^0$ and a corresponding hyper-parameters set $\Phi^0$. The tuning cycle starts with the model hyper-parameters sets generation function $\mathcal{F}$ getting $\Phi^0$ and generating hyper-parameters sets (the original set $\Phi^0$, and P−1 new sets). Then, the model $\Theta^0$ is virtually duplicated into P copies while each copy is trained for L train periods with its corresponding hyper-parameters set over the logged data. After the tuning cycle is due, the model with the best performance metric is selected along with its corresponding hyper-parameters set $(\Theta_m^1, \Phi_m^1)$. The selected pair is stored and used for the next tuning cycle and so on and so forth. A shorter tuning cycle can enable faster adaption of the hyper-parameters set, and a longer cycle can provide more accurate evaluation of each hyper-parameter set.

Figure 4:
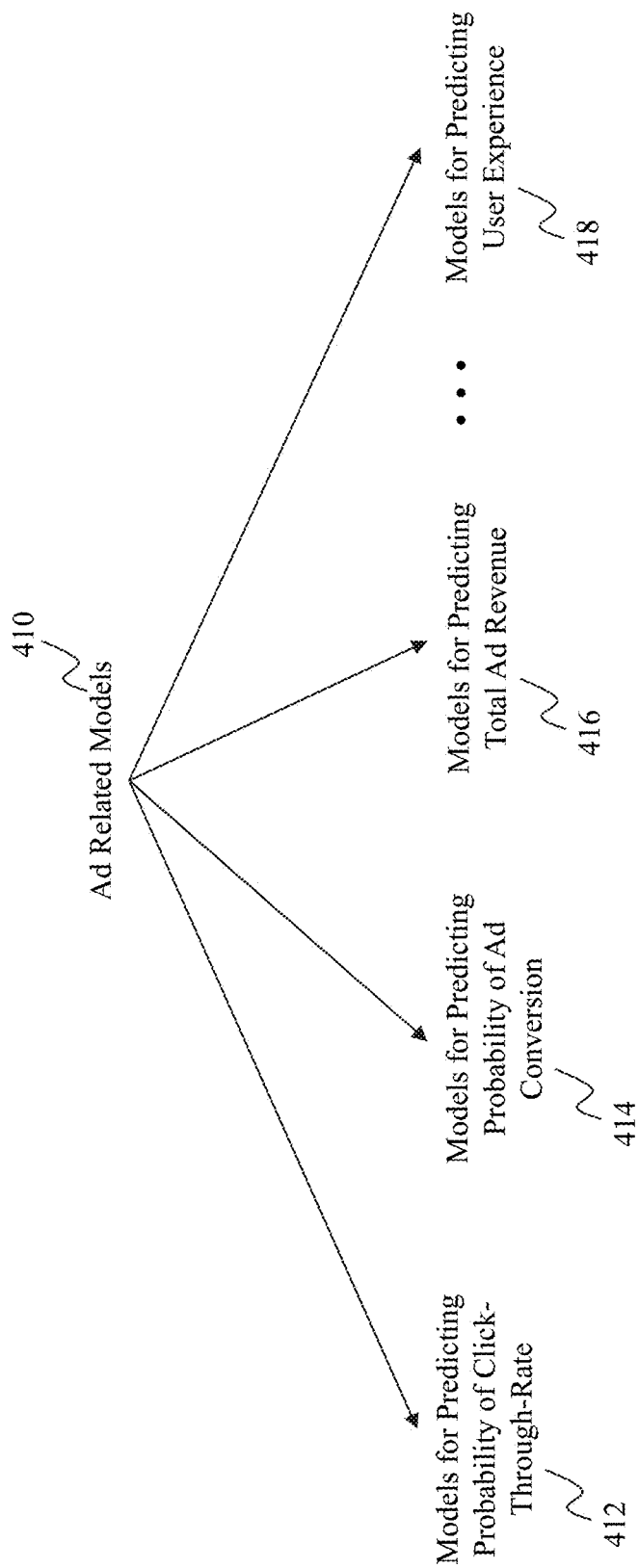
FIG. 4 illustrates exemplary models related to advertisements, according to an embodiment of the present teaching.

FIG. 4 illustrates exemplary models related to advertisements, according to an embodiment of the present teaching. As shown in FIG. 4, the ad related models 410 may include e.g. models for predicting a probability of click-through rate for an advertisement 412; models for predicting a probability of ad conversion rate for an advertisement 414; models for predicting total ad revenue for an advertisement 416; and models for predicting user experience for an advertisement 418.

Figure 5A:
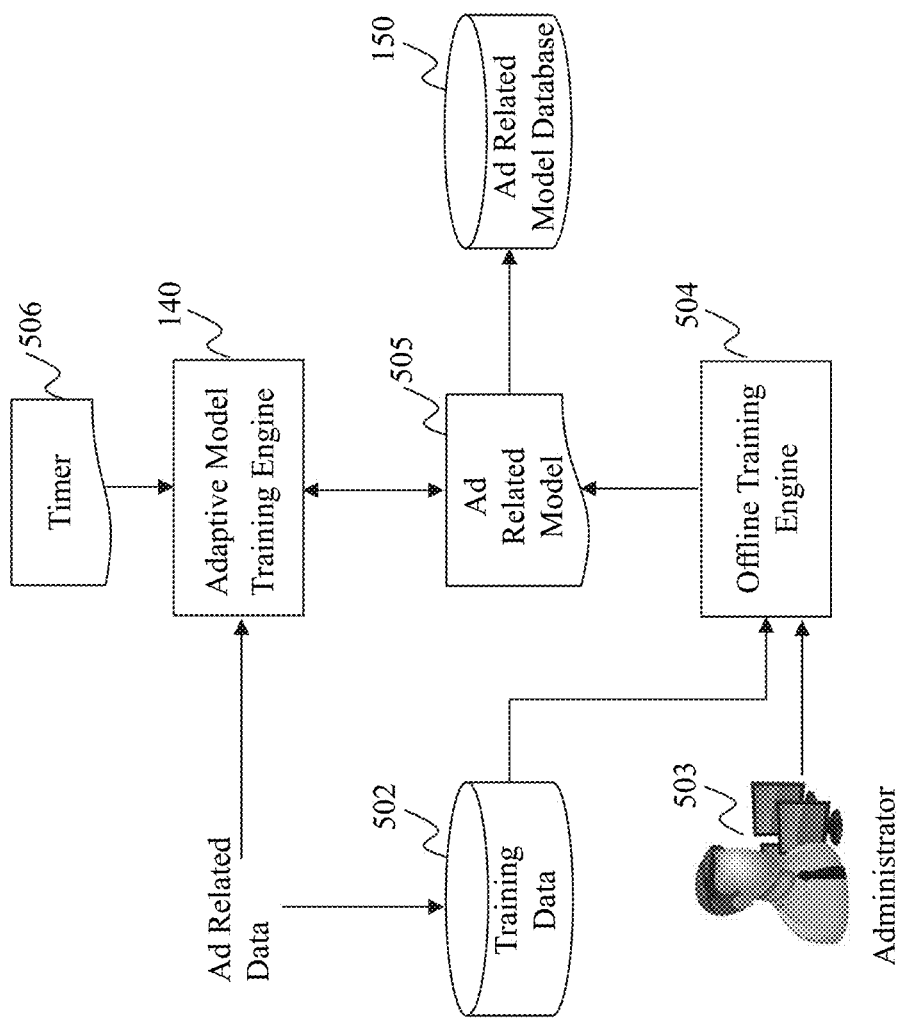
FIG. 5A illustrates an exemplary diagram of a system for generating an ad related model based on both online adaptive training and offline training, according to an embodiment of the present teaching.

FIG. 5A illustrates an exemplary diagram of a system for generating an ad related model based on both online adaptive training and offline training, according to an embodiment of the present teaching. As discussed above, initial parameters for an ad related model can be obtained via offline training over several weeks of logged data. As shown in FIG. 5A, an offline training engine 504 can conduct offline training or tuning procedure to generate an initial version of the ad related model 505 and a corresponding initial hyper-parameter set, based on long time logged training data 502. An administrator 503 may provide requests and/or instructions to the offline training engine 504 for performing the offline training. In various embodiments, the offline training engine 504 and the training data 502 may be standalone (as shown in FIG. 5A) or included in the web service provider 130.

In parallel to the offline training at the offline training engine 504, the adaptive model training engine 140 may perform online adaptive training on the ad related model 505 based on online ad related data, according to a timer 506. For example, the adaptive model training engine 140 may continuously update parameters of the ad related model 505 with each batch of new ad related data every 15 minutes. Each updated version of the ad related model 505 may be stored into the ad related model database 150 for ad selection.

Figure 5B:
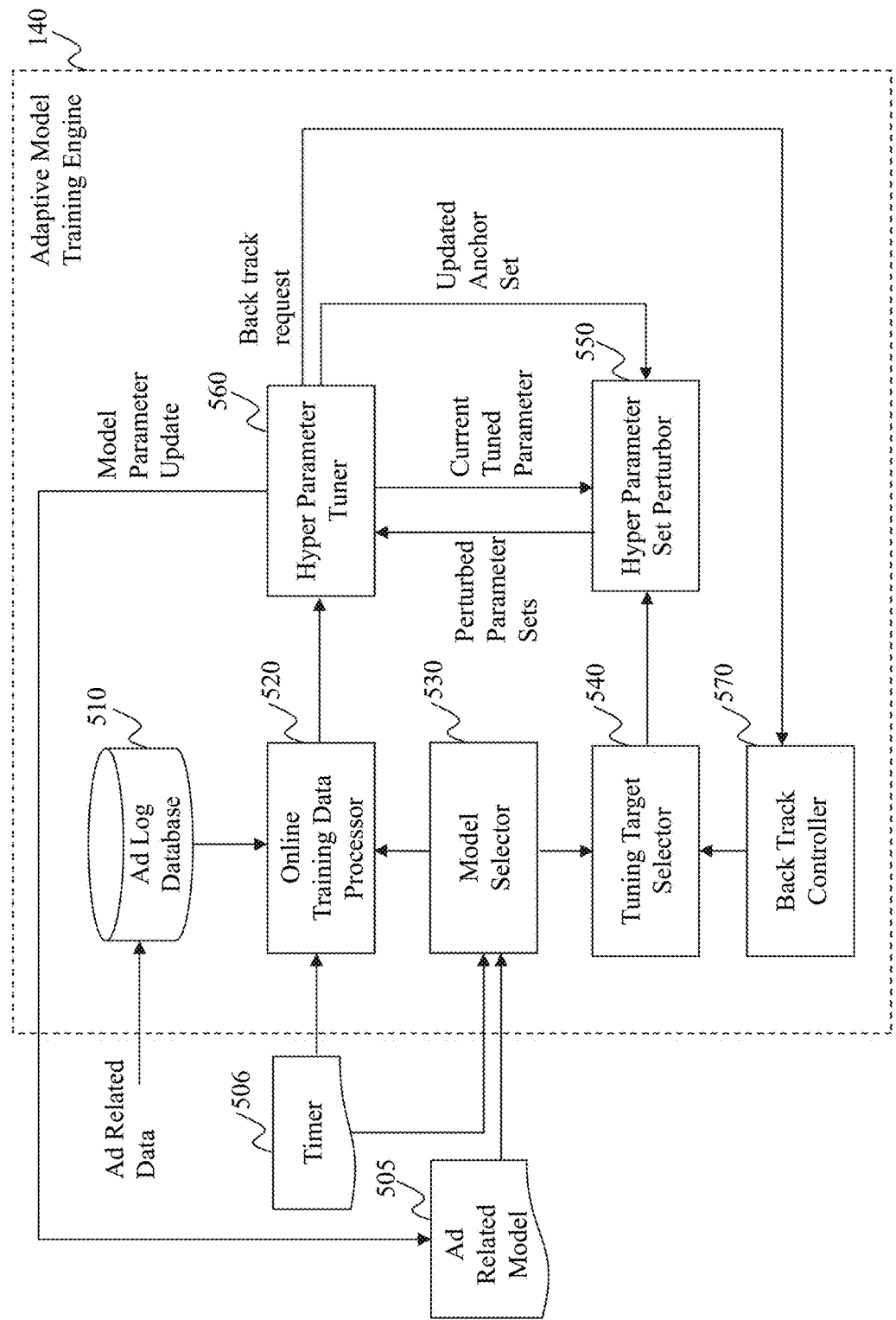
FIG. 5B illustrates an exemplary diagram of an adaptive model training engine, according to an embodiment of the present teaching.

FIG. 5B illustrates an exemplary diagram of an adaptive model training engine 140, according to an embodiment of the present teaching. As shown in FIG. 5B, the adaptive model training engine 140 in this example includes an ad log database 510, an online training data processor 520, a model selector 530, a tuning target selector 540, a hyper parameter set perturbor 550, a hyper parameter tuner 560, and a back track controller 570.

The ad log database 510 in this example may continuously receive and store ad related data for online training. The online training data processor 520 in this example may receive a request for updating the ad related model 505. The request may come from the timer 506 (as shown in FIG. 5B) or from a manager or administrator of the system. Based on the request, the online training data processor 520 may retrieve a new batch of ad related data from the ad log database 510, and process the new batch of ad related data to generate online training data for tuning the parameters of the ad related model 505. The online training data processor 520 may send the processed online training data to the hyper parameter tuner 560 for parameter tuning. The data processing at the online training data processor 520 may be based on a selected model/version sent by the model selector 530.

The model selector 530 in this example may also receive the request for updating the ad related model 505 from the timer 506. The model selector 530 can select a version of the ad related model 505 for parameter tuning. As discussed above, the model selector 530 may select a version corresponding to the latest "best model" determined based on previous online training of the model. The model selector 530 may then send the selected version to the online training data processor 520 for processing training data and to the tuning target selector 540 for selecting tuning targets.

The tuning target selector 540 in this example may select one or more tuning targets in the model to be tuned. The one or more tuning targets may include a set of hyper parameters in the model. In different embodiments, the tuning target selector 540 may determine different hyper parameter sets to be tuned, e.g. one or more of regularization constant, initial step size, and adaptive gradient parameters. The tuning target selector 540 may also determine initial values for the selected hyper parameter set and send the initial hyper parameter set to the hyper parameter set perturbor 550.

The hyper parameter set perturbor 550 in this example may receive the initial hyper parameter set from the tuning target selector 540 and generate a plurality of perturbed copies of the hyper parameters. Each perturbed copy may have a similar value(s) as the initial hyper parameter set, e.g. by a scale of 1.1, 0.9, etc. The hyper parameter set perturbor 550 may send the plurality of perturbed copies of the hyper parameters and their corresponding models to the hyper parameter tuner 560 for parameter tuning. The tuning is continuous and iterative, such that the hyper parameter set perturbor 550 may receive the current tuned parameter set from the hyper parameter tuner 560 and generate a new plurality of perturbed copies of the hyper parameters based on the current tuned parameter set. The current tuned parameter set may correspond to a "best model" chosen by the hyper parameter tuner 560 for the current iteration. The hyper parameter set perturbor 550 can then send the new plurality of perturbed copies of the hyper parameters and their corresponding models to the hyper parameter tuner 560 for parameter tuning in the next iteration.

The hyper parameter tuner 560 in this example may receive the processed training data from the online training data processor 520 and receive the perturbed copies of parameter sets from the hyper parameter set perturbor 550. The hyper parameter tuner 560 may tune the parameters by calculating a performance metric value for each perturbed copy of parameter sets based on the processed training data and according to a performance metric. The hyper parameter tuner 560 may then select a current tuned parameter set from the perturbed copies of parameter sets based on their respective performance metric values. The hyper parameter tuner 560 may also determine a current "best model" corresponding to the current tuned parameter set. At the end of each iteration, the hyper parameter tuner 560 may send the current tuned parameter set to the hyper parameter set perturbor 550 for generating new copies of perturbed parameter sets.

In one example, the hyper parameter tuner 560 can detect a divergence during the tuning. In such case, the hyper parameter tuner 560 may generate and send a back track request to the back track controller 570 for back tracking to a latest training cycle that did not diverge.

In another example, to avoid divergence during tuning, the system keeps an anchor set of parameters which is known to cause the training to converge, not to diverge. The anchor set may be included in the perturbed copies sent by the hyper parameter set perturbor 550 to the hyper parameter tuner 560. As such, the hyper parameter tuner 560 may update the anchor set at the current iteration and send the updated anchor set to the hyper parameter set perturbor 550 for next iteration.

In yet another example, when a predetermined condition is met, the hyper parameter tuner 560 may generate a model parameter update to update the ad related model 505 based on newly tuned parameters. The predetermined condition may be related to a level of convergence of the model training.

The back track controller 570 in this example may receive a back track request from the hyper parameter tuner 560 and roll back to a latest cycle that did not diverge. The back track controller 570 may then instruct the tuning target selector 540 to select tuning target for the latest cycle to start over the training from that latest cycle.

An example for adaptively training a model based on an OFFSET algorithm is described below. A predicted click-probability or Click-Through-Rate (pCTR) of a given user u and ad a according to OFFSET is given by $$pCTR(u, a) = \frac{1}{1 + \exp^{-(b+v_u^T v_a)}} \in [0, 1]$$

where $v_u, v_a \in \mathbb{R}^n$ denote the user and ad latent factor vectors, respectively, and $b \in \mathbb{R}$ denotes the model bias. The product $v_u^T v_a$ denotes the tenancy score of user u towards ad a, where higher score translates into higher predicted click-probability. Note that $\Theta = \{v_u, v_a, n\}$, are model parameters which are learned from the logged data.

Both ad and user vectors are constructed using their features, which enable dealing with the data sparsity issues (when native ad CTR is less than 1%). For ads, one can use a simple summation between the vectors of the unique creative id, campaign id, and advertiser id (currently 3 feature vectors, all in dimension D). The combination between the different user feature vectors may be a bit more complex to allow non-linear dependencies between feature pairs.

The user vectors can be constructed using their K features latent vectors $v_k \in \mathbb{R}^d$ (e.g., age, gender, geo, etc.). In particular, o entries are devoted for each pair of user feature types, and s entries are devoted for each feature type vector alone. The dimension of a single feature vector is $d = (K-1) \cdot o + s$, where the dimension of the combined user vector is $$D = \binom{K}{2} \cdot o + K \cdot s$$

(The ad's side features have the same dimension D in order to allow an inner product between the two vectors). The advantage of this principle over a standard CF approach is that the model can only include K feature latent factor vectors instead of hundreds of millions unique user latent factor vectors.

To learn the model parameters $\Theta$, the system minimizes the logistic loss (LogLoss) of the training data set $\mathcal{T}$ (e.g., past impressions and clicks) using one-pass stochastic gradient descent (SGD) based algorithm. The cost function may be:

$$\operatorname*{argmin}_{\Theta} \sum_{(u,a,y) \in \mathcal{T}} \mathcal{L}(u, a, y)$$

where $$\mathcal{L}(u, a, y) = -(1-y)\log(1 - pCTR(u, a)) - y\log CTR(u, a) + \lambda \sum_{\theta \in \Theta} \theta^2$$

$y \in \{0,1\}$ the click indicator for the event involving user u and ad a, and $\lambda$ is the L2 regularization parameter. For each training event (u,a,y) the system updates its relevant model parameters using SGD step $$\theta \leftarrow \theta + \eta(\theta) \nabla_\theta \mathcal{L}(u,a,y)$$

where $\nabla_\theta \mathcal{L}(u,a,y)$ is the divergence of the objective function w. r. t $\theta$. In addition, the parameter dependent step size is given by $$\eta\theta = \eta_0 \frac{1}{\alpha + \left(\sum_{(u,a,y) \in \mathcal{T}'} |\nabla \mathcal{L}(u, a, y)|\right)^\beta}$$

where $\eta_0$ is the SGD initial step-size, $\alpha,\beta \in \mathbb{R}^+$ are the parameters of an adaptive gradient algorithm, and $\mathcal{T}'$ is the set of training impressions seen so far. A list of hyper-parameters that can be tuned to optimize system performance may include: (a) $\eta_0$—Initial SGD step-size; (b)$\alpha,\beta$—adaptive gradient parameters; and (c) $\lambda$—regularization parameter.

An exemplary hyper-parameter tuning algorithm will be described based on the following notations: $\Theta = \{v_{uf_1}, \ldots v_{uf_K}, v_{a_1}, \ldots, v_{a_l}, b\}$ represents model parameters (K user features latent vectors, l ads latent vectors, and model bias). $\Phi = \{\phi_1, \ldots \phi_n\}$ represents model hyper-parameters set (e.g., regularization constant, SGD initial step size, and adaptive gradient parameters). For simplicity matters one can assume $\psi_i \in \mathbb{R}$ $\Psi = \{\psi_1, \ldots, \psi_n\}$ represents model hyper-parameters constraints $\psi = [a_i, b_i]$; $a_i, b_i \in \mathbb{R}$; $a_i < b_i$. $\mathcal{T} = \{(u,a,y)\}$ represents logged data which includes triplets of user information, ad information, and event label. M: $\Theta, \mathcal{T} \to \mathbb{R}$ represents a performance metric such as stratified AUC and LogLoss. $\mathcal{F}: \Phi; \Phi^p$ represents model hyper-parameter sets generation function which gets a certain model hyper-parameters set $\Phi$, model hyper-parameters constraints $\Psi$, and a positive integer P, and generates P model hyper-parameter sets $\Phi, \Phi_1, \ldots, \Phi_p$. L≥1 represents hyper-parameters tuning cycle in number of model train periods.

The basic idea of the exemplary hyper-parameter tuning algorithm is to continuously train, in parallel, multiple versions of the learning model with P variations of the hyper-parameters set. In the end of each tuning cycle (e.g., an hour or 4 model training periods), each model version is evaluated and the current best hyper-parameters set and resulting model are identified. The training during the next cycle will continue from the best performing model with new generated variations of its hyper-parameters. By doing so, one can continuously experiment with variations of the tuned hyper-parameters set in order to make them adaptive to temporal changes. A formal description of the hyper-parameters tuning algorithm is shown in Algorithm 1.

---

Algorithm 1 Hyper-parameters tuning altorithm

Input: $(\Theta^0, \Phi^0), \Psi, P, L$
Output: $(\Theta^1, \Phi^1), (\Theta^2, \Phi^2), \ldots$ - pairs of best models and corresponding configurations sets for each tuning cycle
1: $t \leftarrow 0$
2: for ever do
3:　generate P hyper-parameter sets
　　$\mathcal{F}(\Phi^t, \Psi) = \{\Phi_1^t, \Phi_2^t, \ldots, \Phi_P^t\}$
4:　duplicate $\Theta^t$ into P copies $\{\Theta_1^t, \Theta_2^t, \ldots, \Theta_P^t\}$
5:　$\Omega \leftarrow 0, l \leftarrow 1$
6:　for $l \leq L$ do
7:　　accumulate data of train period $\mathcal{T}$
8:　　train all P models $\{(\Theta_i^t, \Phi_i^t)\}$ over $\mathcal{T}$
9:　　update performance metric vector $$\Omega \leftarrow \Omega + \frac{1}{L}(M(\Theta_1^t, \mathcal{T}), M(\Theta_2^t, \mathcal{T}), \ldots, M(\Theta_P^t, \mathcal{T}))$$

10:　　$l \leftarrow l + 1$
11:　end for
12:　$(\Theta^{t+1}, \Phi^{t+1}) \leftarrow (\Theta_i^t, \Phi_i^t)$ where $i = \text{argmin } [\Omega]_j$
13:　$t \leftarrow t + 1$
14: end for

---

Here, one can assume an initial parameter tuning procedure via parallel grid search, conducted offline over several weeks of logged data, resulting with an initial mature model $\Theta^0$ and a corresponding hyper-parameters set $\Phi^0$. The tuning cycle starts with the model hyper-parameters sets generation function $\mathcal{F}$ that gets $\Phi^0$ and $\Psi$ generates P hyper-parameters sets (the original set $\Phi^0$, and P−1 new sets). Then, the model $\Theta^0$ is virtually duplicated into P copies while each copy is trained for L train periods with its corresponding hyper-parameters set over the logged data $\mathcal{T}$. After the tuning cycle is due, the model with the best performance metric is selected along with its corresponding hyper-parameters set $(\Theta_m^1, \Phi_m^1)$. The selected pair is stored and used for the next tuning cycle and so on and so forth. Intuitively, a shorter tuning cycle L can enable faster adaption of the hyper-parameters set, and a longer cycle can provide more accurate evaluation of each hyper-parameters set. While the above example provides an error-free procedure assuming all P models do not diverge, how the tuning algorithm handles extreme scenarios will be described later. The disclosed algorithm uses an incremental training, instead of training the model from scratch.

Figure 6:
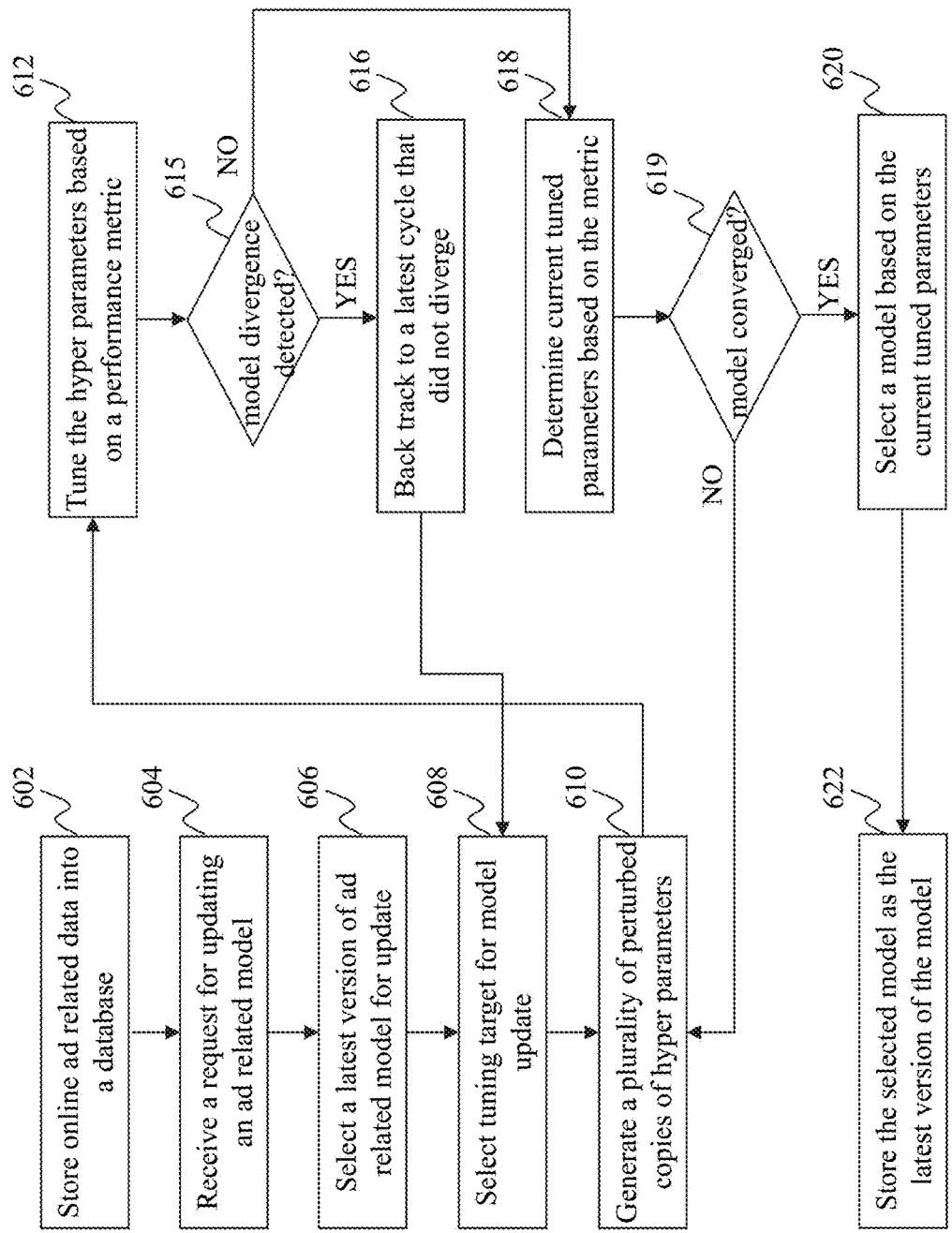
FIG. 6 is a flowchart of an exemplary process performed by an adaptive model training engine, according to an embodiment of the present teaching.

FIG. 6 is a flowchart of an exemplary process performed by an adaptive model training engine, e.g. the adaptive model training engine 140 in FIG. 5A, according to an embodiment of the present teaching. Online ad related data are stored at 602 into a database. A request is received at 604 for updating an ad related model. A latest version of the ad related model is selected at 606 for update. Tuning target including a parameter set may be selected at 608 for model update. A plurality of perturbed copies of hyper parameters is generated at 610. The hyper parameters are tuned at 612 based on a performance metric.

Then at 615, it is determined whether a model divergence is detected. If so, the process goes to 616 to back track to a latest cycle that did not diverge, and then the process goes back to 608. Otherwise, the process goes to 618, wherein current tuned parameters are determined based on the metric, and then the process moves to 619.

At 619, it is determined whether the model training is converged. If so, the process goes to 620 to select a model based on the current tuned parameters and then goes to 622 to store the selected model as the latest version of the model. Otherwise, the process goes back to 610.

Figure 7:
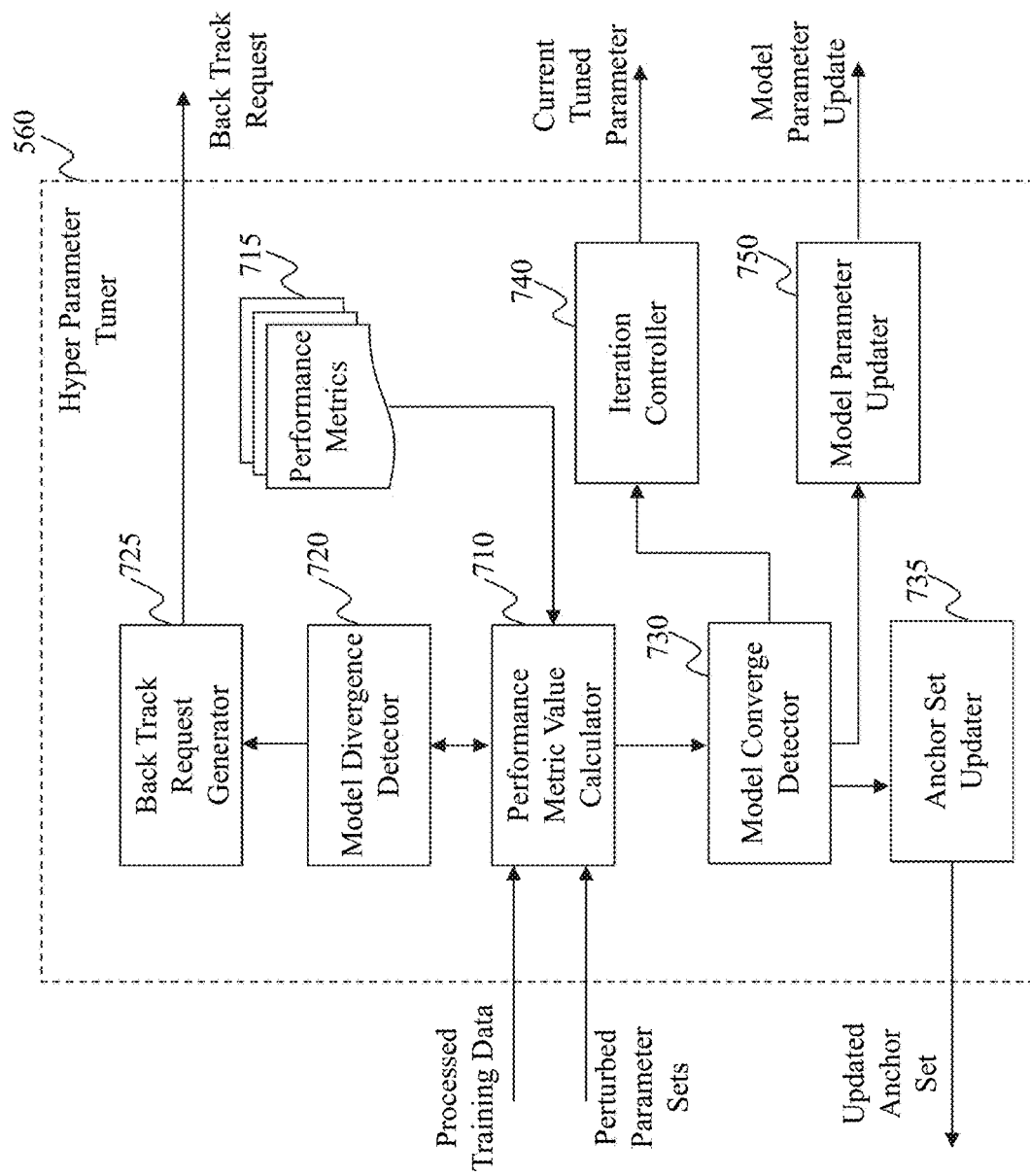
FIG. 7 illustrates an exemplary diagram of a hyper parameter tuner, according to an embodiment of the present teaching.

FIG. 7 illustrates an exemplary diagram of a hyper parameter tuner 560, according to an embodiment of the present teaching. As shown in FIG. 7, the hyper parameter tuner 560 in this example includes a performance metric value calculator 710, a model divergence detector 720, a back track request generator 725, performance metrics 715, a model converge detector 730, an anchor set updater 735, an iteration controller 740, and a model parameter updater 750.

The performance metric value calculator 710 in this example may obtain processed training data from the online training data processor 520 and obtain perturbed parameter sets from the hyper parameter set perturbor 550. For each of the perturbed parameter sets, the performance metric value calculator 710 may calculate a performance metric value based on the processed training data, according to one of the performance metrics 715.

In various embodiments, the performance metrics 715 may include Area-under ROC curve (AUC), Stratified AUC (SAUC), and Logistic loss (LogLoss). The AUC specifies a probability that, given two random events (one positive and one negative, e.g., click and skip), their predicted pairwise ranking is correct. SAUC measures a weighted average (by number of positive event, e.g., number of clicks) of the AUC of each section. SAUC may be used when different sections have different prior click biases and using the section feature alone turns out as sufficient for achieving high AUC values. LogLoss is based on the following:

$$\sum_{(u,a,y)\in \mathcal{T}} -y\log pCTR(u, a) - (1 - y)\log(1 - pCTR(u, a))$$

where $\mathcal{T}$ is a training set and $y \in \{0,1\}$ is the positive event indicator (e.g., click or skip).

The performance metric value calculator 710 in this example may send the calculated performance metric values corresponding to the perturbed parameter sets to the model converge detector 730 for model converge detection and to the model divergence detector 720 for model divergence detection.

The model divergence detector 720 in this example may detect model divergence, e.g. based on the calculated performance metric values corresponding to the perturbed parameter sets. In general, to get a good performance of the tuning mechanism, the constraints of the hyper-parameters should be loose. On the other hand, having a tuning mechanism that uses loose constraints is risky since an SGD based model learning algorithm might diverge. This process may be resembled as a person walking along the edge of a cliff. To get the best view the person wants to get as close to the edge as possible. However, walking very close to the edge is dangerous since the person may slip and fall. Therefore, the system must detect when the person starts to "slip" or detect model divergence here, to make sure that there is a safety harness (e.g. by using anchor configurations), and wear a parachute in case there is falling (e.g. by adding a recovery mechanism).

There are many heuristics to detect model divergence. A simple yet effective way to detect a model divergence event is to monitor the magnitude of the model parameters by checking whether one of them surpasses a predefined threshold. For example, the model divergence detector 720 can declare that a specific model $\Theta$ is diverged if $\exists \theta \in \Theta$, such that $|\theta f| > T_d$ Setting $T_a$ is somewhat tricky since it is data and model dependent. It also presents a trade-off between false-alarm and missed-detection and may need a long calibration process via offline and online buckets experimentation.

When the model divergence detector 720 detects a model divergence, the model divergence detector 720 may inform the performance metric value calculator 710 to stop sending calculated values to the model converge detector 730, and start some recovery mechanism. In general, in case a specific model diverges within a tuning cycle, that model is not updated at the end of the learning period and it will resume training with the next batch of logged data. Such a model may be less updated than the other models, which causes its performance metric to deteriorate and in turn reduces its likelihood to be the best model in the forthcoming cycles. Since in each tuning cycle, the system trains P models in parallel, one diverged model may not be critical. But the whole system may be declared to fail when all P models were diverged at once.

In case all models are diverged at the end of a tuning cycle, the system may roll back and start from the latest cycle that ended correctly (e.g., at least one model did not diverge) using fresh logged data. For example, the model divergence detector 720 may instruct the back track request generator 725 to generate a back track request for rolling back to the latest cycle that did not diverge. The system is able to do so since it stores a series of best models and corresponding hyper-parameters sets. If the next tuning cycle still ends with all models diverging, the system may use the previous correct cycle and resume learning from there and so on and so forth. The system may dive into the past up to a predefined number of cycles. In case all models still diverge after that, the system halts, and human intervention is needed. In this extreme and rare case, the system can be restarted and resume training from scratch or using some other reliable model and hyper-parameters set pairs.

The back track request generator 725 in this example may generate and send a back track request to the back track controller 570 for rolling back to a proper previous cycle to start over there.

The model converge detector 730 in this example may detect whether the model is converged according to a predetermined condition. The predetermined condition may be based on a maximum number of tuning cycles or be related to a level of convergence of the model training. When the predetermined condition is not met, the model converge detector 730 may inform the iteration controller 740 to generate and send current tuned parameters for next iteration. When the predetermined condition is met, the model converge detector 730 may inform the model parameter updater 750 to generate and send information for model parameter update. In addition, when the predetermined condition is met, the model converge detector 730 may instruct the anchor set updater 735 to generate and send an updated anchor set of parameters for future training.

The disclosed tuning system is about generating new hyper-parameters sets in the vicinity of the last winning set, and training copies of the winning model with these new sets using the next logged data batch. This may be a risky move that can bring more revenues but may cause all models to diverge, or alternatively, lead the hyper-parameters tuning into a local minima. To reduce this risk, one can use a small number of predefined hyper-parameters sets (e.g., k=16), referred to as anchor sets, that include parameters with moderate values (e.g., "small" SGD step sizes, and "large" regularization constants) and that were tested over long period of time during which their corresponding models showed no sign of diverging. Those anchor sets $\{\hat{\Phi}_1, \ldots, \hat{\Phi}_k\}$ may be included in the tuning process along with their corresponding models. So in practice after every tuning cycle, the system can store the best model of that tuning cycle, along with the k models that are trained using the anchor hyper-parameters sets. This mechanism can provide safety anchors, preventing the model from "getting lost" in the hyper-parameters search-space. The anchor set updater 735 in this example may generate and send an updated anchor set of parameters to the hyper parameter set perturbor 550 for future training cycles.

The iteration controller 740 in this example may generate and send current tuned parameters to the hyper parameter set perturbor 550 for next iteration. The model parameter updater 750 in this example may generate information for model parameter update and update the ad related model 505 accordingly.

Figure 8:
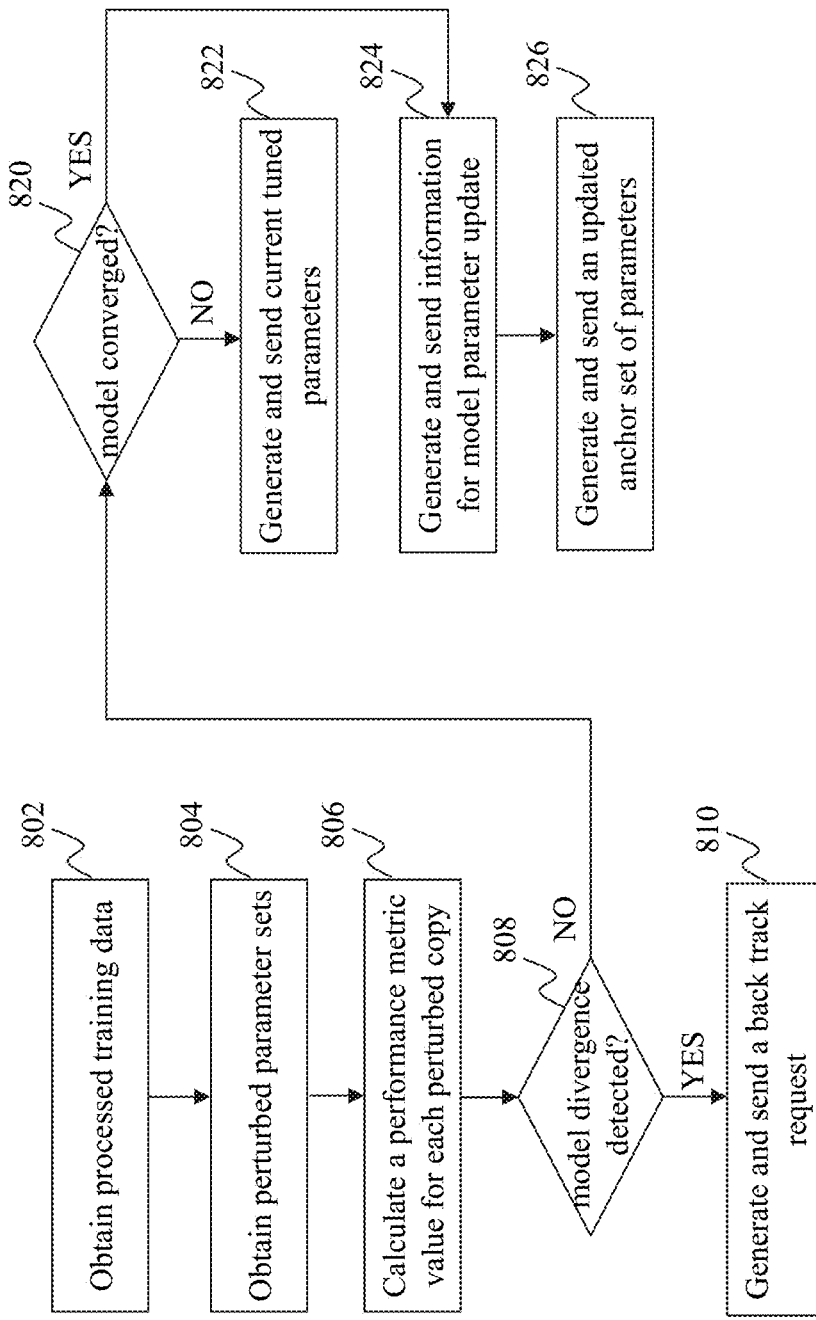
FIG. 8 is a flowchart of an exemplary process performed by a hyper parameter tuner, according to an embodiment of the present teaching.

FIG. 8 is a flowchart of an exemplary process performed by a hyper parameter tuner, e.g. the hyper parameter tuner 560 in FIG. 7, according to an embodiment of the present teaching. Processed training data are obtained at 802. Perturbed parameter sets are obtained at 804. A performance metric value is calculated at 806 for each perturbed copy.

Then at 808, it is determined whether model divergence is detected. If so, the process goes to 810 to generate and send a back track request. Otherwise, the process goes to 820 to determine whether the model is converged. If so, the process goes to 824 to generate and send information for model parameter update and then goes to 826 to generate and send an updated anchor set of parameters. Otherwise, the process goes to 822 to generate and send current tuned parameters.

Figure 9:
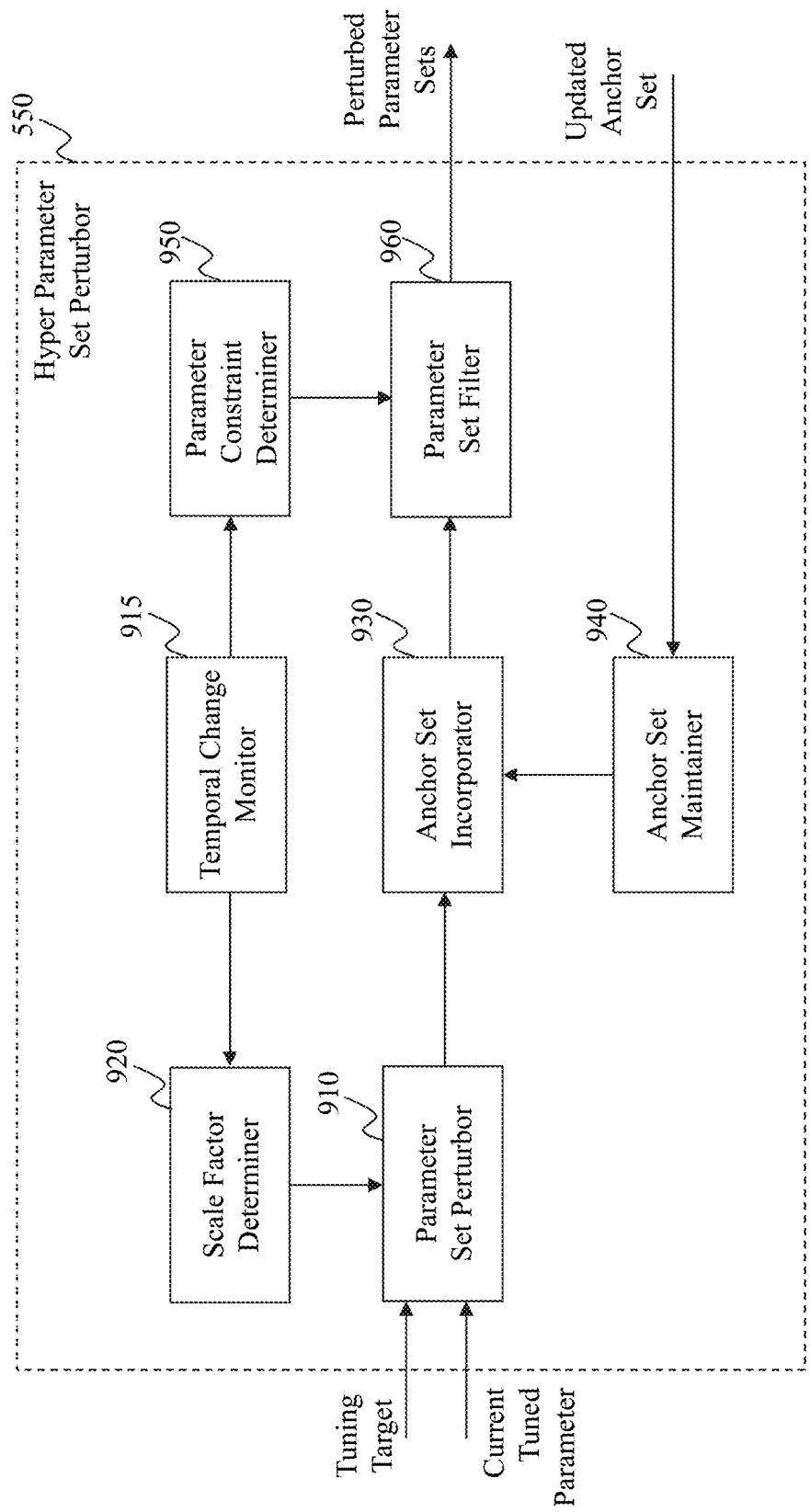
FIG. 9 illustrates an exemplary diagram of a hyper parameter set perturbor, according to an embodiment of the present teaching.

FIG. 9 illustrates an exemplary diagram of a hyper parameter set perturbor 550, according to an embodiment of the present teaching. As shown in FIG. 9, the hyper parameter set perturbor 550 in this example may include a parameter set perturbor 910, a temporal change monitor 915, a scale factor determiner 920, an anchor set incorporator 930, an anchor set maintainer 940, a parameter constraint determiner 950, and a parameter set filter 960.

The parameter set perturbor 910 in this example may receive a tuning target including selected hyper parameters with initial values for the model update from the tuning target selector 540, or receive current tuned parameters from the hyper parameter tuner 560. The parameter set perturbor 910 may generate perturbed copies of the received hyper parameter set, taking into consideration of monitored temporal changes. In general, there are many heuristic ways the parameter set perturbor 910 can generate hyper-parameters sets from a given set. For example, a simple scale-up/scale-down approach may include setting S scale factors (e.g., for S=3: 0.9, 1.0 and 1.1) and using these to generate S new values for each hyper-parameter of the initial set. Then, the system can limit the new values to the predefined constraints $\Psi$ in case they exceed the given bounds. Assuming there are M hyper-parameters for tuning, and S scale factors, the number of new hyper-parameters sets $\mathcal{F}$ generates equals $S^M$, which equal to 81 in case S=3 and M=4. For practical reasons, one may not want the number of new set to exceed a predefined maximum number of sets $P_m$ (e.g. $P_m$=100). Then in case $P>P_m$, one can select the original set and additional $P_m$-1 sets at random.

The temporal change monitor 915 in this example may monitor temporal changes related to ad selection. Temporal changes may include changes from one shopping season to another, e.g. from Thanksgiving to Christmas, or from a holiday season to a non-holiday season. In general, as the learning system keeps learning continuously over time, it may face some temporal changes in the environment/market that will lead the online hyper-parameters tuning to be "stuck" in a local minima. For example, in the ad marketplace, during the holiday season, there is an enormous daily addition of new ads. In such a scenario, identifying good new ads may be a critical factor for ad revenue. Thus, the hyper-parameters of the model are adapted to allow more rapid changes in the model itself (e.g. a larger step size). This puts more weight on quick learning of new ads rather than more accurate learning of familiar ads. However, as the holiday season abruptly ends, it is difficult for the hyper-parameters to move away from that area in the hyper-parameters search-space. The tuning algorithm is now "stuck" in a local minima. The hyper-parameters were able to adjust to a temporal change in the environment and they cannot find their way back once that state of the environment is back to normal. Anchor hyper-parameters set as discussed above can be utilized to deal with scenarios of this sort. The temporal change monitor 915 in this example may send the monitored temporal changes to the scale factor determiner 920 for determining scaling factors and to the parameter constraint determiner 950 for determining parameter constraints.

The scale factor determiner 920 in this example may determine scale factors, e.g. 0.9, 1.0 and 1.1, etc., and send the scale factors to the parameter set perturbor 910 for generating perturbed copies of parameter sets based on a given set. In one embodiment, the scale factors may be determined based on monitored temporal changes at 915. In another embodiment, the parameter set perturbor 910 may use other methods to generate perturbed copies, e.g. by adding a small value to the given set of parameters.

The anchor set incorporator 930 in this example may receive the generated perturbed copies of parameter sets from the parameter set perturbor 910 and incorporate an anchor set selected by the anchor set maintainer 940 into the perturbed copies.

The anchor set maintainer 940 in this example may receive an updated anchor set from the hyper parameter tuner 560 after iteration in each tuning cycle when there is convergence. The anchor set maintainer 940 may maintain multiple versions of anchor sets and select one of them in each cycle to be incorporated by the anchor set incorporator 930.

The parameter constraint determiner 950 in this example may receive monitored temporal changes from the temporal change monitor 915 and determine parameter constraints for filtering the parameter sets. The parameter constraint determiner 950 may send the parameter constraints to the parameter set filter 960 for filtering the parameter sets.

The parameter set filter 960 in this example may receive the generated parameter sets including an anchor set from the anchor set incorporator 930 and receive the parameter constraints from the parameter constraint determiner 950. The parameter set filter 960 can filter the generated parameter sets based on the parameter constraints and send the filtered perturbed parameter sets to the hyper parameter tuner 560 for parameter tuning in next iteration.

Figure 10:
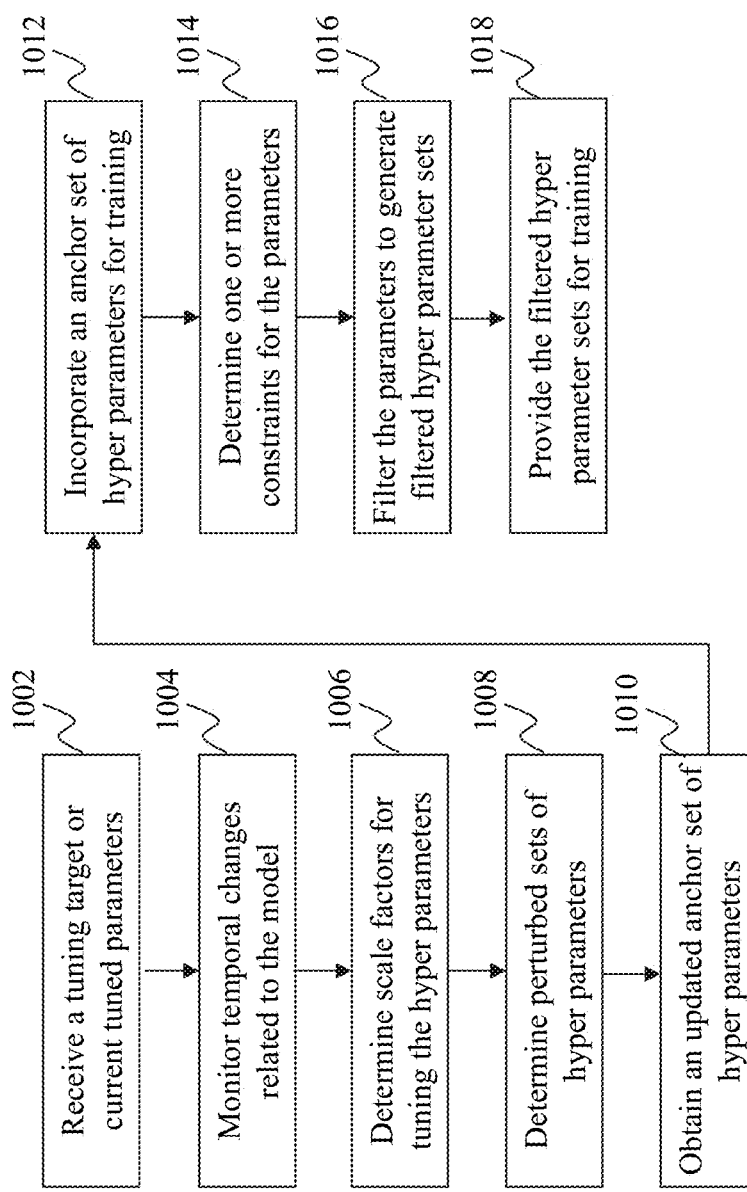
FIG. 10 is a flowchart of an exemplary process performed by a hyper parameter set perturbor, according to an embodiment of the present teaching.

FIG. 10 is a flowchart of an exemplary process performed by a hyper parameter set perturbor, e.g. the hyper parameter set perturbor 550 in FIG. 9, according to an embodiment of the present teaching. At 1002, a tuning target or current tuned parameters are received. Temporal changes related to the model are monitored at 1004. One or more scale factors are determined at 1006 for tuning the hyper parameters. A plurality of perturbed sets of hyper parameters are determined at 1008.

At 1010, an updated anchor set of hyper parameters is obtained. An anchor set of hyper parameters is incorporated at 1012 for training. One or more constraints are determined at 1014 for the parameter sets. The parameter sets are filtered at 1016 to generate filtered hyper parameter sets. The filtered hyper parameter sets are provided at 1018 for training.

Figure 11:
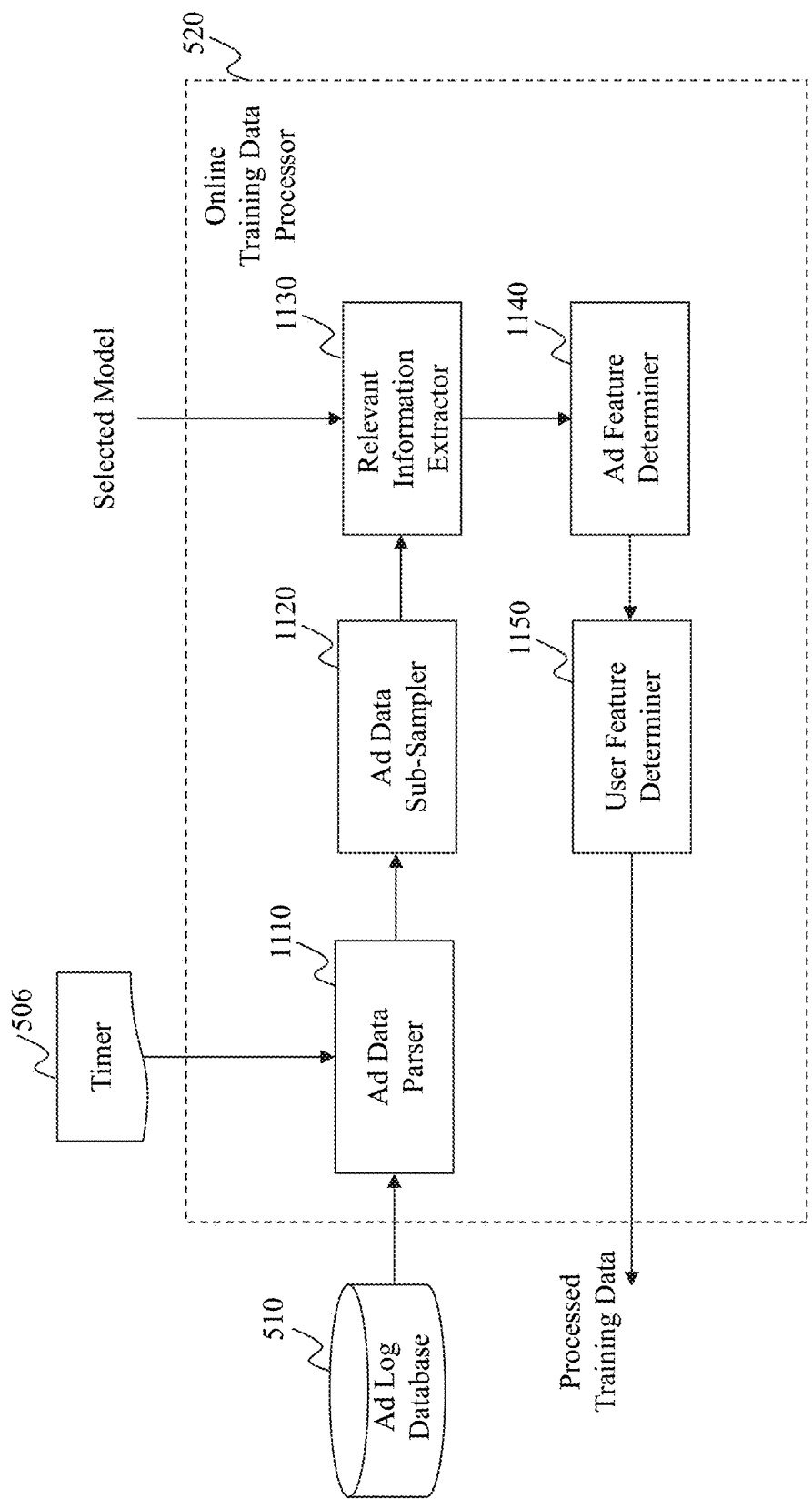
FIG. 11 illustrates an exemplary diagram of an online training data processor, according to an embodiment of the present teaching.

FIG. 11 illustrates an exemplary diagram of an online training data processor 520, according to an embodiment of the present teaching. As shown in FIG. 11, the online training data processor 520 in this example includes an ad data parser 1110, an ad data sub-sampler 1120, a relevant information extractor 1130, an ad feature determiner 1140, and a user feature determiner 1150.

The ad data parser 1110 in this example may receive a request for updating an ad related model, e.g. from the timer 506 for every 10 or 15 minutes. The ad data parser 1110 in this example may retrieve new ad log data from the ad log database 510 based on the request and parse the retrieved ad log data. The ad data parser 1110 may then send the parsed data to the ad data sub-sampler 1120.

The ad data sub-sampler 1120 in this example may receive the parsed data from the ad data parser 1110 and sub-sample the parsed data. The ad data sub-sampler 1120 may send the sub-sampled data to the relevant information extractor 1130.

The relevant information extractor 1130 in this example may receive the selected model from the model selector 530. As discussed above, the selected model may correspond to a latest "best model" determined in previous training cycle.

The relevant information extractor 1130 may extract relevant information from the sub-sampled ad data for the model based on the selected model. The relevant information extractor 1130 may send the extracted relevant data to the ad feature determiner 1140.

The ad feature determiner 1140 in this example may determine ad related features based on the relevant training data. The user feature determiner 1150 in this example may determine user related features based on the relevant training data. Then, the user feature determiner 1150 in this example may send the processed training data to the hyper parameter tuner 560 for updating the model.

Exemplary system architecture based on OFFSET is discussed below. The OFFSET training process is sequential, running on a single machine. Hence, it is important that the learning of a single batch takes a short time, e.g. less than 15 minutes. Therefore, the input data should be preprocessed quickly and be organized for OFFSET to consume. For this purpose, one can use a map-reduce based mechanism to execute OFFSET training. The input data may be processed by multiple mappers in parallel. Each mapper employs sub-sampling (e.g. 1 of 50 impressions and all clicks) and extracts for each sampled event only the relevant information required for training. The map key is composed of a serialization of the hyper-parameters set to allow models with different hyper-parameters sets to be trained in parallel. OFFSET can then be executed on a single reducer per hyper-parameters set and train over all pre-processed entries.

Using multiple reducers for different hyper-parameters sets enables a seamless parameter selection process with little additional cost. Such a design allows training hundreds of models in parallel, each with a unique set of training hyper-parameters set. One can take advantage of this architecture and perform an initial training with parallel grid-search of "good" hyper-parameters set (or configuration). After training over a few weeks of logged data offline, which may take a few days to execute, the "best" hyper-parameters set and its resulting model, according to some predefined performance metric, can be selected to serve online traffic.

Figure 12:
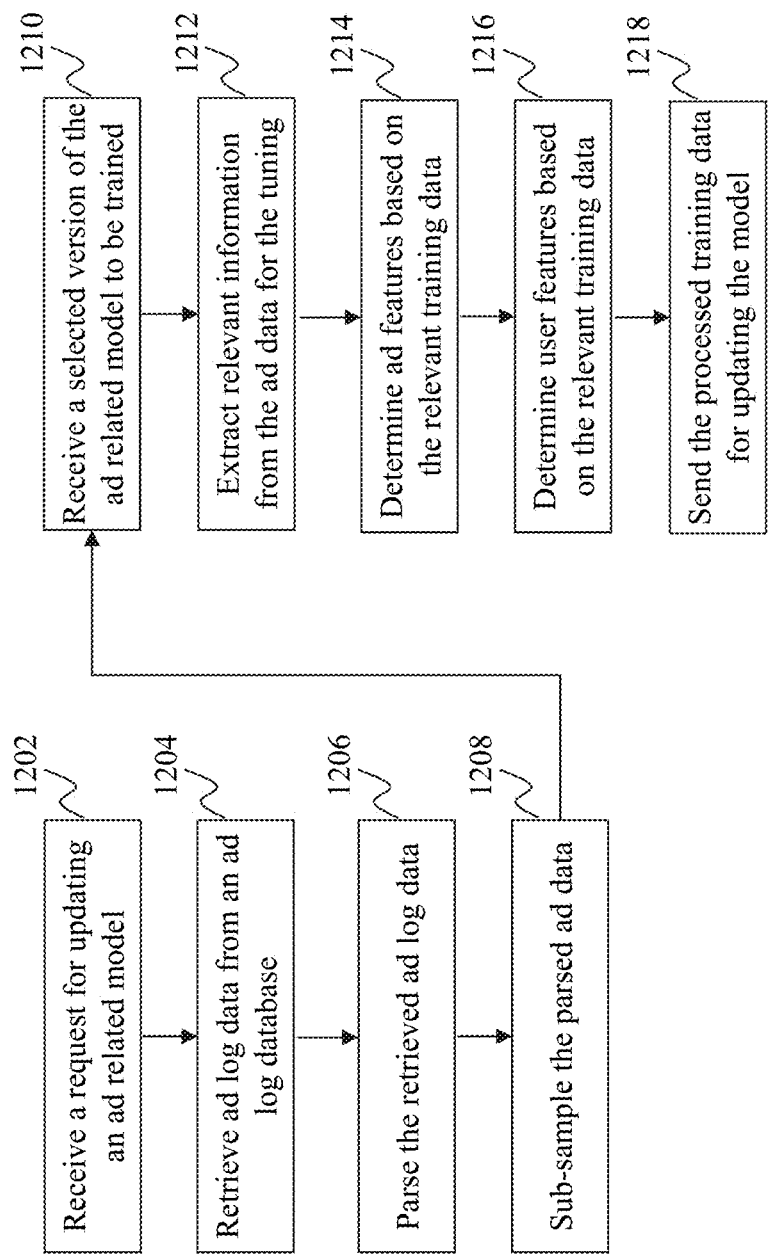
FIG. 12 is a flowchart of an exemplary process performed by an online training data processor, according to an embodiment of the present teaching.

FIG. 12 is a flowchart of an exemplary process performed by an online training data processor, e.g. the online training data processor 520 in FIG. 11, according to an embodiment of the present teaching. A request is received at 1202 for updating an ad related model. Ad log data are retrieved at 1204 from an ad log database. The retrieved ad log data are parsed at 1206. The parsed ad data are sub-sampled at 1208.

A selected version of the ad related model to be trained is received at 1210. Relevant information is extracted at 1212 from the ad data for the model tuning. Ad features are determined at 1214 based on the relevant training data. User features are determined at 1216 based on the relevant training data. The processed training data are sent at 1218 for updating the model.

Figure 13:
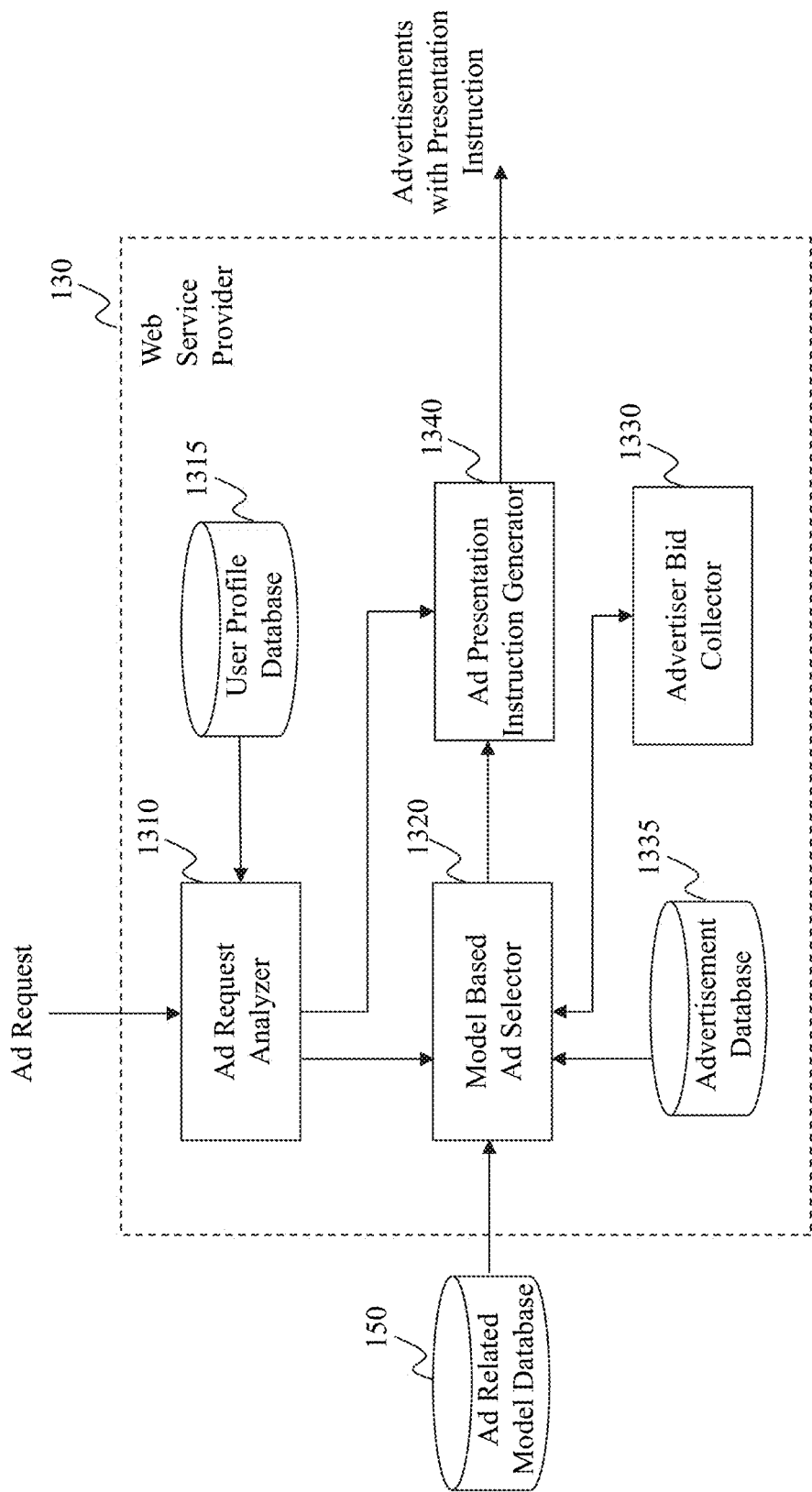
FIG. 13 illustrates an exemplary diagram of a web service provider, according to an embodiment of the present teaching.

FIG. 13 illustrates an exemplary diagram of a web service provider 130, according to an embodiment of the present teaching. As shown in FIG. 13, the web service provider 130 in this example includes an ad request analyzer 1310, a user profile database 1315, a model based ad selector 1320, an advertisement database 1335, an advertiser bid collector 1330, and an ad presentation instruction generator 1340.

The ad request analyzer 1310 in this example may receive and analyze an ad request from a user. Based on the ad request, the ad request analyzer 1310 may retrieve a user profile of the user from the user profile database 1315 and determine personal information of the user and ad related information with respect to the request. For example, the personal information may include user ID, user location, and demographic information of the user; the ad related information may include preferred ad type of the user and current time, date and environment with respect to the ad request. The ad request analyzer 1310 may send all of the information to the model based ad selector 1320 for ad selection and to the ad presentation instruction generator 1340 for generating ad presentation instructions.

The advertiser bid collector 1330 in this example may collect bids from advertisers who intend to provide their advertisements to the user via the web service provider 130 and send the collected bids to the model based ad selector 1320.

The model based ad selector 1320 in this example may obtain an ad related model from the ad related model database 150. As discussed above, the ad related model may have been trained and tuned based on an adaptive algorithm described above. The model based ad selector 1320 may select an advertisement from the advertisement database 1335 based on the ad related model, the information received from the ad request analyzer 1310 and the collected bids from the advertiser bid collector 1330. The model based ad selector 1320 may send the selected advertisement to the ad presentation instruction generator 1340.

The ad presentation instruction generator 1340 in this example may generate an ad presentation instruction based on information received from the ad request analyzer 1310, e.g. user preference of presentation style and layout. The ad presentation instruction generator 1340 in this example may send one or more advertisements with the ad presentation instruction to the user as a response to the ad request.

In practice, there may be an ad serving system, e.g. a Gemini native serving platform that serves ads across many web service providers. Based on the disclosed model, each web service provider may select which ads to show a user in a certain context while maximizing revenue, maintaining a good user experience and a healthy marketplace (e.g., not starving out small advertisers). Therefore, for each impression, the system can conduct a generalized second price (GSP) auction, and use the click and conversion prediction models, campaign budgets and bids, and various rules, such as frequency and recency of displaying a certain ad to a specific user, to perform ad-ranking over the ad inventory.

Figure 14:
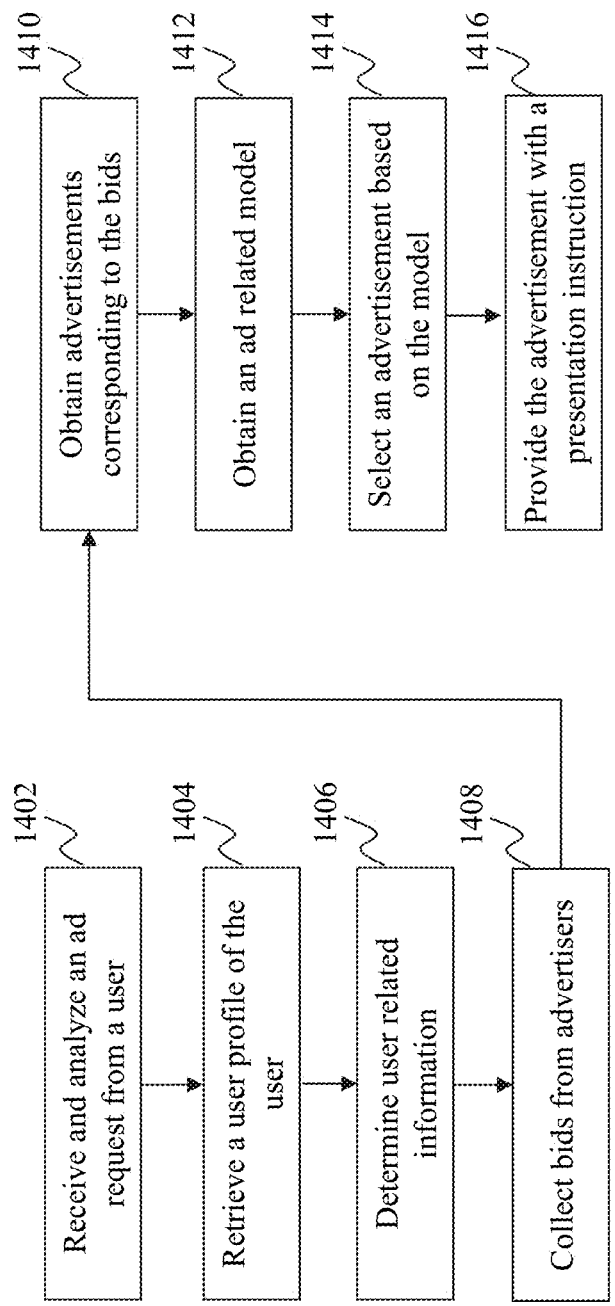
FIG. 14 is a flowchart of an exemplary process performed by a web service provider, according to an embodiment of the present teaching.

FIG. 14 is a flowchart of an exemplary process performed by a web service provider, e.g. the web service provider 130 in FIG. 13, according to an embodiment of the present teaching. At 1402, an ad request is received from a user and analyzed. A user profile of the user is retrieved at 1404. User related information is determined at 1406. Bids are collected at 1408 from advertisers. At 1410, advertisements are obtained corresponding to the bids. An ad related model generated/updated according to a method disclosed herein is obtained at 1412. An advertisement is selected at 1414 based on the model. The advertisement is provided at 1416 with a presentation instruction.

It can be understood that the order of the steps shown in FIG. 6, FIG. 8, FIG. 10, FIG. 12 and FIG. 14 may be changed according to different embodiments of the present teaching.

Figure 15:
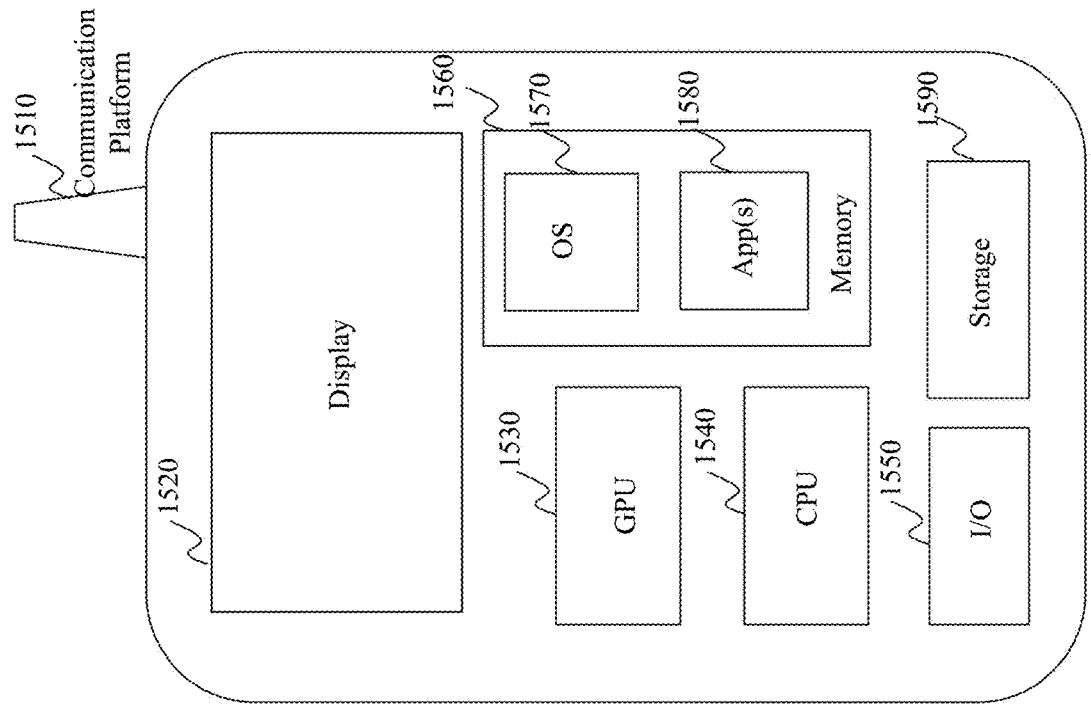
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which web content or advertisement is presented and interacted-with is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for receiving web content or advertisement on the mobile device 1500. User interactions with the web content or advertisement may be achieved via the I/O devices 1550 and provided to the adaptive model training engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the adaptive model training engine 140, the web service provider 130 and/or other components of systems 100 and 200 described with respect to FIGS. 1-14). The hardware elements, operating systems and programming languages of such computers are conventional in nature, and it is presumed that those skilled in the art are adequately familiar therewith to adapt those technologies to adaptively update an online model related to advertisement selection as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
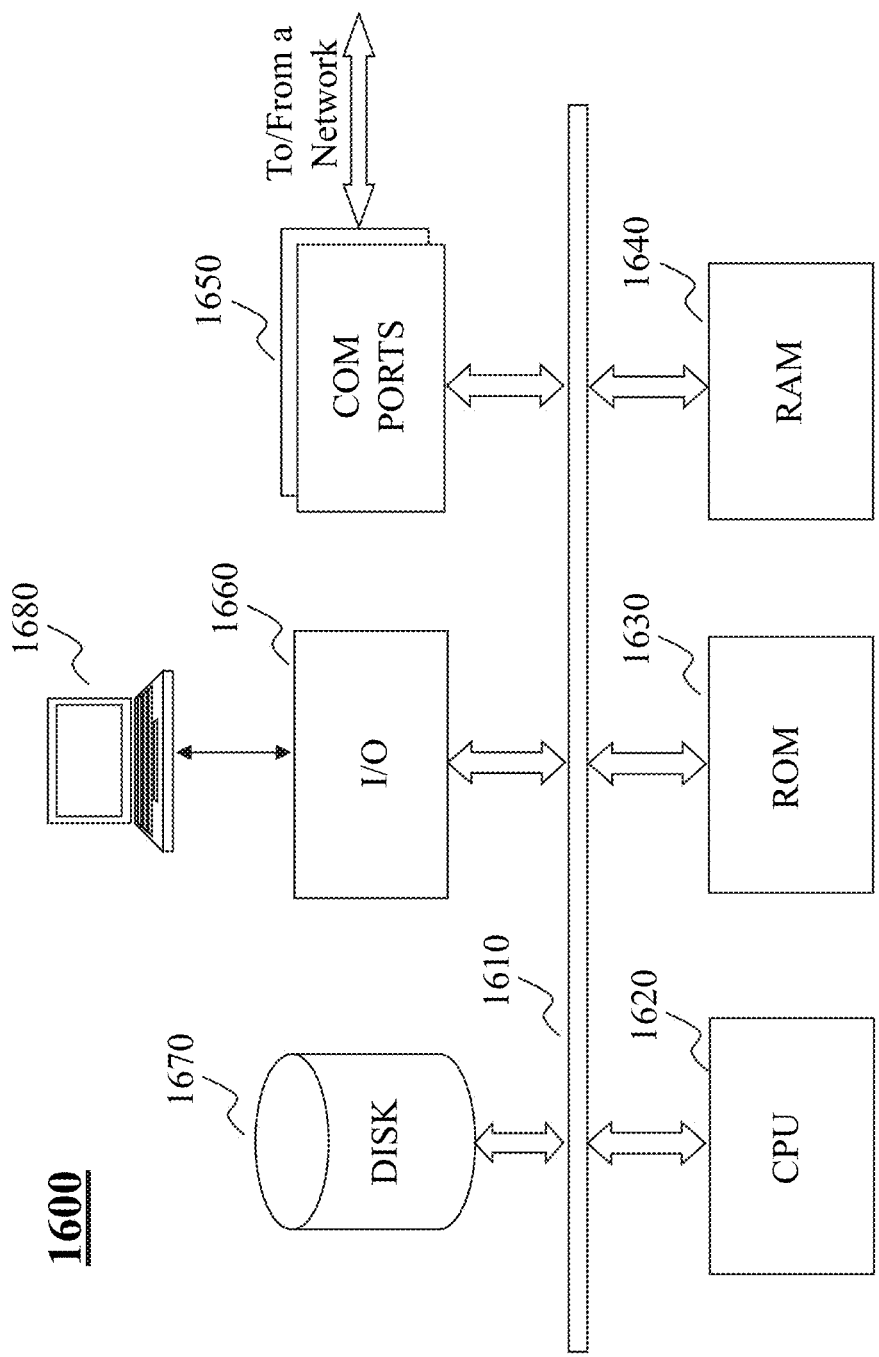
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the techniques of adaptively updating an online model related to advertisement selection, as described herein. For example, the web service provider 130, the adaptive model training engine 140, etc., may be implemented on a computer such as computer 1600, via its hardware, software program, firmware, or a combination thereof. Although only one such computer is shown, for convenience, the computer functions relating to adaptively updating an online model related to advertisement selection as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of adaptively updating an online model related to advertisement selection, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with adaptively updating an online model related to advertisement selection. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, adaptively updating an online model related to advertisement selection as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for generating an updated model related to advertisement selection, the method comprising:
   obtaining a request for updating a model to be utilized for selecting an advertisement;
   generating a plurality of copies of the model, wherein the model is pre-selected based on a performance metric related to advertisement selection;
   creating, for each of the plurality of copies, a candidate model by modifying a value of one or more hyper parameters of the copy of the model based on one or more scale factors to create a plurality of candidate models, wherein the one or more scale factors are determined based on one or more temporal changes indicating a shift from a first time period associated with a first amount of new advertisements to a second time period associated with a second amount, different from the first amount, of new advertisements, and the one or more temporal changes indicate a change of a weight associated with a type of learning of new advertisements associated with learning of the model and are detected from streaming ad-related data;
   selecting one of the plurality of candidate models based on the performance metric;
   repeating the steps of generating, creating, and selecting until a predetermined condition is met; and
   updating the model with the latest selected candidate model when the predetermined condition is met.

2. The method of claim 1, further comprising:
   detecting a divergence of the model when performing the steps of generating, creating, and selecting;
   tracking back to a latest cycle of generating, creating, and selecting when the model did not diverge; and
   continuing the steps of generating, creating, and selecting from the latest cycle.

3. The method of claim 1, further comprising:
   detecting a convergence of the model when performing the steps of generating, creating, and selecting;
   generating an anchor set of hyper parameters that are known to cause the convergence of the model; and
   storing the anchor set for future model update.

4. The method of claim 1, wherein modifying the value of the one or more hyper parameters comprises:
   monitoring the one or more temporal changes related to the model; and
   generating one or more perturbed values of the one or more hyper parameters based on the one or more scale factors.

5. The method of claim 1, further comprising:
   obtaining ad related data online in real time;
   parsing the ad related data according to a timer;
   sub-sampling the ad related data;
   extracting relevant information from the ad related data based on the model;
   determining, in the relevant information, features related to advertisements and users for whom an advertisement is to be selected, to generate processed training data; and
   calculating, based on the processed training data, a value for the performance metric for each of the plurality of candidate models, wherein selecting the one of the plurality of candidate models is based on the value for the performance metric for each of the plurality of candidate models.

6. The method of claim 1, wherein the model is updated online and has been pre-trained offline to determine an initial value of the one or more hyper parameters.

7. The method of claim 1, wherein the updated model is to be utilized for at least one of:
   predicting a probability of click-through rate for an advertisement;
   predicting a probability of ad conversion rate for an advertisement;
   predicting a total ad revenue for an advertisement; or
   predicting user experience for an advertisement.

8. A system having at least one processor, storage comprising computer program instructions stored therein, and a communication platform connected to a network for generating an updated model related to advertisement selection, comprising:
   an online training data processor, implemented via the at least one processor executing the computer program instructions, and configured for obtaining a request for updating a model to be utilized for selecting an advertisement;
   a hyper parameter set perturbor, implemented via the at least one processor executing the computer program instructions, and configured for:
      generating a plurality of copies of the model, wherein the model is pre-selected based on a performance metric related to advertisement selection, and
      creating, for each of the plurality of copies, a candidate model by modifying a value of one or more hyper parameters of the copy of the model based on one or more scale factors to create a plurality of candidate models, wherein the one or more scale factors are determined based on one or more temporal changes indicating a shift from a first time period associated with a first amount of new advertisements to a second time period associated with a second amount, different from the first amount, of new advertisements, and the one or more temporal changes indicate a change of a weight associated with a type of learning of new advertisements associated with learning of the model and are detected from streaming ad-related data; and a hyper parameter tuner, implemented via the at least one processor executing the computer program instructions, and configured for:
    selecting one of the plurality of candidate models based on the performance metric, wherein the steps of generating, creating, and selecting are repeated until a predetermined condition is met, and
    updating the model with the latest selected candidate model when the predetermined condition is met.

9. The system of claim 8, wherein:
the hyper parameter tuner comprises a model divergence detector, implemented via the at least one processor executing the computer program instructions, and configured for detecting a divergence of the model when performing the steps of generating, creating, and selecting; and
the system further comprises a back track controller, implemented via the at least one processor executing the computer program instructions, and configured for tracking back to a latest cycle of generating, creating, and selecting when the model did not diverge to continue the steps of generating, creating, and selecting from the latest cycle.

10. The system of claim 8, wherein the hyper parameter tuner comprises:
a model converge detector, implemented via the at least one processor executing the computer program instructions, and configured for detecting a convergence of the model when performing the steps of generating, creating, and selecting; and
an anchor set updater, implemented via the at least one processor executing the computer program instructions, and configured for:
    generating an anchor set of hyper parameters that are known to cause the convergence of the model, and
    storing the anchor set for future model update.

11. The system of claim 8, wherein modifying the value of the one or more hyper parameters comprises:
monitoring the one or more temporal changes related to the model; and
generating one or more perturbed values of the hyper parameters based on the one or more scale factors.

12. The system of claim 8, wherein the online training data processor comprises:
an ad data parser, implemented via the at least one processor executing the computer program instructions, and configured for obtaining ad related data online in real time and parsing the ad related data according to a timer;
an ad data sub-sampler, implemented via the at least one processor executing the computer program instructions, and configured for sub-sampling the ad related data;
a relevant information extractor, implemented via the at least one processor executing the computer program instructions, and configured for extracting relevant information from the ad related data based on the model; and
an ad feature determiner and a user feature determiner, implemented via the at least one processor executing the computer program instructions, and configured for:
    determining, in the relevant information, features related to advertisements and users for whom an advertisement is to be selected, to generate processed training data, wherein a value for the performance metric for each of the plurality of candidate models is calculated, wherein selecting the one of the plurality of candidate models is based on the value for the performance metric for each of the plurality of candidate models.

13. The system of claim 8, wherein the model is updated online and has been pre-trained offline to determine an initial value of the one or more hyper parameters.

14. The system of claim 8, wherein the updated model is to be utilized for at least one of:
predicting a probability of click-through rate for an advertisement;
predicting a probability of ad conversion rate for an advertisement;
predicting a total ad revenue for an advertisement; or
predicting user experience for an advertisement.

15. A non-transitory machine-readable medium having information recorded thereon for generating an updated model related to advertisement selection, wherein the information, when read by the machine, causes the machine to perform operations comprising:
obtaining a request for updating a model to be utilized for selecting an advertisement;
generating a plurality of copies of the model, wherein the model is pre-selected based on a performance metric related to advertisement selection;
creating, for each of the plurality of copies, a candidate model by modifying a value of one or more hyper parameters of the copy of the model based on one or more scale factors to create a plurality of candidate models, wherein the one or more scale factors are determined based on one or more temporal changes indicating a shift from a first time period associated with a first amount of new advertisements to a second time period associated with a second amount, different from the first amount, of new advertisements, and the one or more temporal changes indicate a change of a weight associated with a type of learning of new advertisements associated with learning of the model and are detected from streaming ad-related data;
selecting one of the plurality of candidate models based on the performance metric;
repeating the steps of generating, creating, and selecting until a predetermined condition is met; and
updating the model with the latest selected candidate model when the predetermined condition is met.

16. The medium of claim 15, wherein the operations further comprise:
detecting a divergence of the model when performing the steps of generating, creating, and selecting;
tracking back to a latest cycle of generating, creating, and selecting when the model did not diverge; and
continue the steps of generating, creating, and selecting from the latest cycle.

17. The medium of claim 15, wherein the operations further comprise:
detecting a convergence of the model when performing the steps of generating, creating, and selecting;
generating an anchor set of hyper parameters that are known to cause the convergence of the model; and
storing the anchor set for future model update.

18. The medium of claim 15, wherein modifying the value of the one or more hyper parameters comprises:
monitoring the one or more temporal changes related to the model; and
generating one or more perturbed values of the one or more hyper parameters based on the one or more scale factors.

19. The medium of claim 15, wherein the operations further comprise:
 obtaining ad related data online in real time;
 parsing the ad related data according to a timer;
 sub-sampling the ad related data;
 extracting relevant information from the ad related data based on the model;
 determining, in the relevant information, features related to advertisements and users for whom an advertisement is to be selected, to generate processed training data; and
 calculating, based on the processed training data, a value for the performance metric for each of the plurality of candidate models, wherein selecting the one of the plurality of candidate models is based on the value for the performance metric for each of the plurality of candidate models.

20. The medium of claim 15, wherein the model is updated online and has been pre-trained offline to determine an initial value of the one or more hyper parameters.

21. The medium of claim 15, wherein the updated model is to be utilized for at least one of:
 predicting a probability of click-through rate for an advertisement;
 predicting a probability of ad conversion rate for an advertisement;
 predicting a total ad revenue for an advertisement; or
 predicting user experience for an advertisement.

* * * * *